United States Patent
Okumura et al.

(10) Patent No.: US 9,541,155 B2
(45) Date of Patent: Jan. 10, 2017

(54) MOUNTING MEMBER FOR VIBRATION DAMPING DEVICE AND VIBRATION DAMPING DEVICE USING THE SAME

(71) Applicant: TOKAI RUBBER INDUSTRIES, LTD., Komaki-shi, Aichi (JP)

(72) Inventors: Kei Okumura, Kakamigahara (JP); Wakako Michiyama, Owariasahi (JP); Yasuhiro Komiya, Kasugai (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 175 days.

(21) Appl. No.: 14/328,081

(22) Filed: Jul. 10, 2014

(65) Prior Publication Data
US 2015/0041617 A1 Feb. 12, 2015

(30) Foreign Application Priority Data

Aug. 9, 2013 (JP) .................................. 2013-166143
Oct. 16, 2013 (JP) .................................. 2013-215226

(51) Int. Cl.
| F16F 7/00 | (2006.01) |
| F16F 13/08 | (2006.01) |
| F16F 13/10 | (2006.01) |
| F16F 1/371 | (2006.01) |
| F16F 1/38 | (2006.01) |

(52) U.S. Cl.
CPC .............. *F16F 13/08* (2013.01); *F16F 1/371* (2013.01); *F16F 1/3828* (2013.01); *F16F 1/3842* (2013.01); *F16F 1/3863* (2013.01); *F16F 13/103* (2013.01)

(58) Field of Classification Search
USPC ....... 248/560, 562, 568, 570, 573, 618, 619, 248/629, 631, 632, 634, 636, 638; 267/136, 140.11, 140.13, 140.3, 267/140.4, 141, 141.1, 141.2, 141.4
See application file for complete search history.

(56) References Cited

U.S. PATENT DOCUMENTS

| 4,647,023 A * | 3/1987 | Ray ....................... F16F 13/106 |
| | | 267/140.13 |
| 5,076,532 A * | 12/1991 | Noguchi ............. F16F 13/1481 |
| | | 248/562 |
| 5,964,456 A | 10/1999 | Someya |

(Continued)

FOREIGN PATENT DOCUMENTS

| DE | 20 2012 104 655 U1 | 2/2013 |
| JP | A-56-35808 | 4/1981 |

(Continued)

OTHER PUBLICATIONS

Jan. 4, 2016 Office Action issued in Chinese Patent Application No. 201410390196.X.

(Continued)

*Primary Examiner* — Terrell McKinnon
*Assistant Examiner* — Michael McDuffie
(74) *Attorney, Agent, or Firm* — Oliff PLC

(57) ABSTRACT

A mounting member for use in a vibration damping device equipped with a main rubber elastic body and a bracket, including: a fixing member configured to be fixed to the bracket; an anchoring member made of resin and configured to be anchored to the main rubber elastic body. The anchoring member is anchored to the fixing member and protrudes from the fixing member.

4 Claims, 20 Drawing Sheets

(56) References Cited

U.S. PATENT DOCUMENTS

| | | | | |
|---|---|---|---|---|
| 6,357,731 | B1* | 3/2002 | Tanahashi | F16F 13/10 267/140.13 |
| 6,409,158 | B1* | 6/2002 | Takashima | F16F 13/101 267/140.13 |
| 6,536,113 | B2* | 3/2003 | Guillemot | F16F 13/107 267/140.13 |
| 6,793,207 | B2* | 9/2004 | Umemura | F16F 13/105 267/140.13 |
| 7,293,755 | B2* | 11/2007 | Miyahara | F16F 13/16 248/560 |
| 7,635,116 | B2* | 12/2009 | Bellamy | B29C 45/14467 248/521 |
| 8,231,116 | B2* | 7/2012 | Nishi | F16F 13/10 267/118 |
| 8,485,506 | B2* | 7/2013 | Matsuda | F16F 13/105 267/140.11 |
| 8,579,269 | B2* | 11/2013 | Takakura | B60K 5/1208 267/140.13 |
| 2006/0220288 | A1* | 10/2006 | Okumura | F16F 13/264 267/140.13 |
| 2011/0210230 | A1* | 9/2011 | Nishi | F16F 13/108 248/562 |
| 2013/0112839 | A1* | 5/2013 | Kato | F16F 13/101 248/562 |
| 2015/0345583 | A1* | 12/2015 | Ishikawa | F16F 3/0873 248/634 |
| 2016/0040747 | A1* | 2/2016 | Hayashi | B60K 5/1208 267/141 |

FOREIGN PATENT DOCUMENTS

| | | |
|---|---|---|
| JP | A-2002-227912 | 8/2002 |
| JP | A-2005-226699 | 8/2005 |
| JP | B2-4146210 | 9/2008 |
| JP | A-2010-48281 | 3/2010 |
| JP | 2012-036971 A | 2/2012 |
| JP | A-2013-108522 | 6/2013 |

OTHER PUBLICATIONS

Aug. 2, 2016 Office Action issued in Chinese Patent Application No. 201410390196.X.

* cited by examiner

MOUNTING MEMBER FOR VIBRATION DAMPING DEVICE AND VIBRATION DAMPING DEVICE USING THE SAME

INCORPORATED BY REFERENCE

The disclosures of Japanese Patent Application Nos. 2013-166143 filed on Aug. 9, 2013 and 2013-215226 filed on Oct. 16, 2013, each including the specification, drawings and abstract is incorporated herein by reference in its entirety.

BACKGROUND OF THE INVENTION

1. Field of the Invention

The present invention relates to a vibration damping device to be used, for example, as engine mounts, body mounts, sub-frame mounts and the like on motor vehicles as well as to a mounting member for a vibration damping device constituting such device.

2. Description of the Related Art

Conventionally, there has been known a vibration damping device such as the one described in U.S. Pat. No. 5,964,456 as a kind of vibration damping coupling body or a vibration damping supporting body interposed between the members constituting a vibration transmission system. The vibration damping device has the structure where a first mounting member and a second mounting member are elastically connected by a main rubber elastic body.

Meanwhile, a bracket is attached to the first mounting member of the vibration damping device. The vibration damping device described in U.S. Pat. No. 5,964,456 has the first mounting member and the bracket overlaid and fixed on top of each other by a bolt.

However, since the structure described in U.S. Pat. No. 5,964,456 requires a fixing bolt to fix the first mounting member to the bracket, the number of parts is increased, posing a problem of structural complication, and at the same time, it requires to use a comparatively large fixing bolt to firmly fix the first mounting member to the bracket, which is likely to pose a problem of increased weight. Also, attaching the fixing bolt requires multiple rounds of screwing operations, which is cumbersome and time consuming, while posing another problem of difficulties in controlling the fixing power by the magnitude of tightening torque of the fixing bolt.

Japanese Unexamined Patent Publication No. JP-A-2010-048281 adopts the structure where a bracket is press-fitted in a first mounting member in a cylindrical shape covered with a rubber sheath layer along the inner peripheral surface. However, since the first mounting member in a cylindrical shape is formed by pressing a metal plate, the upper portion where the bracket is inserted into and the lower portion where the main rubber elastic body is fixed are made integrally, the upper and lower portions restrict the shapes of each other, posing a problem of lower degree of design freedom. That is, the first mounting member has the shape and size of its upper portion set in accordance with those of the bracket, whereas the shape and size of its lower portion is favorably set in accordance with the vibration damping properties and the like. However, in the structure where the upper and lower portions are integrally made, once the shape of the upper portion is determined in line with the bracket, it was difficult to freely design the shape of the lower portion to maximize the vibration damping performance since the shape of the lower portion is limited to the one moldable by press work corresponding to the upper portion. In addition, the amount of protrusion of the lower portion beyond the upper portion is limited to the range moldable by pressing a metal plate, which posed a risk of difficulties in fully meeting the need for a larger protrusion.

Also, Japanese Unexamined Patent Publication No. JP-A-2013-108522 proposes a structure where the bracket is connected to the mounting member as if being embraced by it, by means of bending the plate portion (25) of the first mounting member (the second mounting fitting 5 in JP-A-2013-108522) along the surface of the bracket. However, according to this structure of JP-A-2013-108522, the bolt that fixes the first mounting member to the bracket is no longer needed, whereas there was an inevitable problem of increased size of the joint portion between the first mounting member and the bracket. In addition, by providing a large plate bent to embrace the outside of the bracket, there was a potential problem of increased size of the first mounting member itself.

Therefore, it was hard to say that any of the structures described in JP-A-2010-048281 and JP-A-2013-108522 was good for the first mounting member, which means that there was a room for improvement.

SUMMARY OF THE INVENTION

The present invention was made against the background described above, and the problems to be solved are to provide a first mounting member having a novel structure where fixing to the bracket is made possible in a compact manner by a simple structure with less number of parts preventing any increase in the size while a degree of freedom can be secured in designing the shape of the portion to be anchored to the main rubber elastic body, and to provide a vibration damping device using the first mounting member.

Aspects of the present invention designed to solve the above problems will be described below. The parts adopted in each of the aspects described below are also adoptable in as many combinations as possible.

That is, a first aspect of the present invention provides a mounting member for use in a vibration damping device equipped with a main rubber elastic body and a bracket, including: a fixing member configured to be fixed to the bracket; and an anchoring member made of resin and configured to be anchored to the main rubber elastic body, wherein the anchoring member is anchored to the fixing member and protrudes from the fixing member.

In the mounting member for a vibration damping device having the structure according to the present aspect, the degree of freedom in setting the shape and size thereof is dramatically improved by adopting the resin-made anchoring member, which enables to provide the anchoring member in an appropriate shape and size according to the inputted load and vibration and the like. In addition, by adopting the resin-made anchoring member, it is now possible to make the fixing member for fixing to the bracket to be easily integrated with the anchoring member by means of, for example, insert molding.

Therefore, it is now possible to choose a structure for fixing the anchoring member to the bracket with a greater degree of freedom using the fixing member, and the fixing member integrally provided to the anchoring member eliminates the need for other special parts for fixation such as fixing bolts, which makes it feasible to provide a mounting member for a vibration damping device that can be fixed to the bracket with a simple structure in a compact manner preventing any increase in the size thereof.

A second aspect of the present invention provides the mounting member for a vibration damping device according to the first aspect, wherein the fixing member comprises a cylindrical joint member configured to receive the bracket fitted therein, the anchoring member is anchored to a part of an outer peripheral face of the cylindrical joint member, and the anchoring member protrudes outward from the outer peripheral face of the cylindrical joint member.

In the mounting member for a vibration damping device having the structure according to the present aspect, the cylindrical joint member where the bracket is inserted into and the anchoring member anchored to the main rubber elastic body are made separate from each other, and each shape can be freely set independently. This makes it possible to achieve an excellent vibration damping performance by means of freely setting the shape of the anchoring member corresponding to the required vibration damping properties.

Especially, by having the anchoring member made of resin, a further improvement is made to the degree of freedom in designing the shape of the anchoring member, whereas weight reduction can be achieved as opposed to the one made of metal. Meanwhile, by means of forming the cylindrical joint member with a metal material, a sufficient supporting rigidity of the bracket is ensured.

A third aspect of the present invention provides the mounting member for a vibration damping device according to the second aspect, wherein the anchoring member integrally includes a main body portion protruding from an outer peripheral face of a peripheral wall portion of the cylindrical joint member as well as configured to be anchored to the main rubber elastic body, and an engaging part that is engaged with an inner peripheral face of the peripheral wall portion of the cylindrical joint member.

According to the present aspect, the anchoring member is engaged with the cylindrical joint member to be fixed more firmly by means of arranging the main body portion and the engaging part of the anchoring member on the inside and outside of the cylindrical joint member across the peripheral wall portion. Especially, if the main body portion and the engaging part are each anchored to the cylindrical joint member, the anchoring area can be secured large enough to achieve even stronger fixation.

A fourth aspect of the present invention provides the mounting member for a vibration damping device according to the third aspect, wherein a communication hole is formed through the peripheral wall portion of the cylindrical joint member so that the main body portion and the engaging part of the anchoring member are connected to each other via the communication hole.

According to the present aspect, the main body portion and the engaging part can be connected integrally to each other even if the main body portion and the engaging part are provided in the middle portion short of reaching the distal end of the peripheral wall portion of the cylindrical joint member in the axial direction.

A fifth aspect of the present invention provides the mounting member for a vibration damping device according to the third or fourth aspect, wherein the main body portion and the engaging part of the anchoring member are connected to each other at an opening of the cylindrical joint member.

According to the present aspect, it is now possible to integrally connect the main body portion and the engaging part of the anchoring member to each other without forming a special hole on the cylindrical joint member by means of providing a joint portion between the main body portion and the engaging part of the anchoring member outside the opening of the cylindrical joint member.

A sixth aspect of the present invention provides the mounting member for a vibration damping device according to any one of the third to fifth aspects, wherein a recess is formed on the peripheral wall portion of the cylindrical joint member so as to open to the inner peripheral face thereof, and the engaging part of the anchoring member is anchored to the recess.

According to the present aspect, the engaging part is prevented from protruding from the inner peripheral surface of the cylindrical joint member by having the engaging part of the anchoring member contained in the recess of the cylindrical joint member, thus simplifying the shape of the inner peripheral surface of the insertion hole of the bracket consisting of the engaging part and the cylindrical joint member.

A seventh aspect of the present invention provides a vibration damping device including: a first mounting member; a second mounting member; a main rubber elastic body elastically connecting the first and second mounting members; and a bracket fixed to the first mounting member, wherein the first mounting member is composed of a mounting member according to any one of the second to sixth aspects, the main rubber elastic body is anchored to the anchoring member, and a rubber sheath layer is adhered to an inner peripheral face of the cylindrical joint member so that the bracket is fitted in the cylindrical joint member via the rubber sheath layer.

In the vibration damping device having the structure according to the present aspect, the bracket is stably supported by the cylindrical joint member to which the rubber sheath layer is adhered, while the anchoring member made of resin with a high degree of design freedom effectively enables to obtain the intended vibration damping performance.

An eighth aspect of the present invention provides the mounting member for a vibration damping device according to the first aspect, wherein the anchoring member comprises a block-form base portion configured to be anchored to the main rubber elastic body, the fixing member has at least one crimping piece that protrudes from the base portion, and the base portion is configured to be overlaid on the bracket so as to have the crimping piece inserted into at least one insertion hole formed through the bracket and a tip end of the crimping piece fixed by being bent to overlay on a peripheral edge of an opening of the insertion hole of the bracket from an opposite side of the base portion.

In the vibration damping device having the structure according to the present aspect, additional parts such as the mounting member and the bolt to fix the bracket are no longer needed since the bracket is fixed in between the base portion of the mounting member and the crimping piece, which enables to fix the mounting member and the bracket with a simple structure with less number of parts.

In addition, since the crimping piece is inserted into the insertion hole penetrating through the bracket, any increase in size of the joint portion is avoided as opposed to the structure where the bracket is fixed by the mounting member as if it wraps around the outside of the bracket, while the crimping piece can be made relatively small, thus avoiding any increase in the size of the mounting member itself.

Also, the mounting member is configured by means of anchoring to each other the base portion and the crimping piece that are formed separately from each other. Therefore, it is now possible to obtain both the base portion that is light weight and easy to ensure the strength of adhesion to the main rubber elastic body and the crimping piece that can achieve a strong enough crimping fixation with less thickness in a highly compatible manner. In addition, since the base portion is made in a block form, enough load bearing capacity can be achieved easily, while the anchoring area between the base portion and the crimping piece can be secured large enough.

In addition, according to the present aspect, weight reduction and a greater degree of design freedom can be favorably realized by making the base portion of synthetic resin, while fixation of the bracket is made possible by bending process, and the crimping piece becomes readily available in a given shape using a press metal mold and the like. Moreover, anchoring between the base portion and the crimping piece can easily be performed, for example by inserting the crimping piece into the base portion during the formation of the base portion.

A ninth aspect of the present invention provides the mounting member for a vibration damping device according to the eighth aspect, wherein the at least one crimping piece provided in the fixing member comprises a plurality of crimping pieces, and at least two of the crimping pieces are bent in directions different from each other.

According to the present aspect, the mounting member and the bracket are fixed more firmly by being fixed at multiple locations and by having the crimping pieces bent in different directions from each other.

A tenth aspect of the present invention provides the mounting member for a vibration damping device according to the eighth or ninth aspect, wherein the crimping piece is covered with a rubber sheath layer.

According to the present aspect, contact corrosion such as galvanic metal corrosion can be avoided as opposed to the case where the crimping piece and the bracket are directly overlaid on top of each other, thus achieving improved durability.

An eleventh aspect of the present invention provides the mounting member for a vibration damping device according to any one of the eighth to tenth aspects, wherein the fixing member comprises a separate cylindrical member protruding from the base portion, a protrusion tip of the cylindrical member is divided in a circumferential direction so that the at least one crimping piece comprises a plurality of crimping pieces formed along a circumference, and the crimping pieces are inserted into the one insertion hole so as to have each tip end of the crimping pieces bent toward an outer periphery and overlaid on the peripheral edge of the opening of the insertion hole from the opposite side of the base portion.

According to the present aspect, since the plurality of crimping pieces are inserted into one insertion hole to be fixed therein, it is now possible to firmly fix the mounting member to the bracket even with a few holes. In addition, since the tip of the protrusion of the cylindrical member is divided in the circumferential direction to form the plurality of crimping pieces, the tip of the crimping pieces are bent toward the outer periphery in different directions from each other, thus enabling to obtain fixing strength between the mounting member and the bracket in a more favorable manner.

A twelfth aspect of the present invention provides the mounting member for a vibration damping device according to any one of the eighth to eleventh aspects, wherein the crimping piece of the fixing member is covered with a rubber sheath layer, the insertion hole of the bracket is made in a slit form, and the crimping piece is inserted to be fixed in the insertion hole so that the insertion hole is sealed fluid-tight.

According to the present aspect, since the insertion hole is sealed by the crimping piece covered with the rubber sheath layer, a buildup of rainwater and the like in the insertion hole can be prevented. Also, since each crimping piece is inserted into one insertion hole even if the crimping piece and insertion hole are provided in plurality, arrangement of the crimping pieces and the insertion holes as well as bending directions of the crimping pieces can be set with a greater degree of freedom.

A thirteenth aspect of the present invention provides the mounting member for a vibration damping device according to the twelfth aspect, wherein the at least one crimping piece provided in the fixing member comprises a plurality of crimping pieces, the at least one insertion hole formed in the bracket comprises a plurality of insertion holes each made in a slit form extending in parallel to each other, and the crimping pieces are inserted into the respective insertion holes.

According to the present aspect, since the plurality of insertion holes in a slit form are arranged at a distance from each other in the width direction, the fixing strength between the mounting member and the bracket can be efficiently obtained even if the bending directions of the crimping pieces are all the same.

A fourteenth aspect of the present invention provides a vibration damping device including: a first mounting member; a second mounting member; a main rubber elastic body elastically connecting the first and second mounting members; and a bracket fixed to the first mounting member, wherein the first mounting member is composed of a mounting member according to any one of the eighth to thirteenth aspects, the main rubber elastic body is anchored to the base portion, and the bracket provided with the insertion hole is attached to the first mounting member and the crimping piece of the fixing member is inserted into the insertion hole of the bracket to be crimped and fixed thereto.

According to the present aspect, a vibration damping device can be composed of a mounting member relating to any of the eighth to thirteenth aspects having the structure according to the present invention. Using such a vibration damping device, each of the technical effects described above is effectively exerted by means of providing the mounting member with the specific structure described above.

A fifteenth aspect of the present invention provides the vibration damping device according to the fourteenth aspect, further including a fluid chamber whose wall is partially defined by the main rubber elastic body, the fluid chamber containing non-compressible fluid sealed therein, wherein the first mounting member is composed of a mounting member according to the eleventh aspect, the main rubber elastic body is anchored to the base portion, the bracket provided with the insertion hole is attached to the first mounting member and the crimping piece of the cylindrical member is inserted into the insertion hole of the bracket to be crimped and fixed thereto, and a filler hole is formed to extend within the cylindrical member to penetrate through the base portion, one end of the filler hole opening to the wall of the fluid chamber while another end opening to an inner peripheral side of the cylindrical member, and the filler hole is sealed fluid-tight by a plug.

In the fluid-filled vibration damping device having the structure according to the present aspect, since the filler hole opens to the central hole of the cylindrical member, it is now possible to form a simple filler hole and pour non-compressible fluid into the fluid chamber via the filler hole. It is also possible to pour non-compressible fluid into the fluid chamber through a filler hole that opens toward the inner periphery of the cylindrical member after the bracket is attached to the mounting member.

In the mounting member for a vibration damping device relating to the present invention and the vibration damping device using it, the mounting member is configured by having the fixing member to which the bracket is fixed and the resin-made anchoring member to be anchored to the main rubber elastic body anchored or adhered to each other, and the shape and size of the fixing member and the anchoring member are configurable independently from each other. Therefore, the supporting strength of the bracket is secured by setting the shape and size of the fixing member in accordance with the bracket's structure, while excellent vibration damping performance and durability of the vibration damping device can be achieved by setting the shape and size of the anchoring member in accordance with the vibration damping properties required for the vibration damping device and the anchoring strength to the main rubber elastic body and the like.

Especially according to the mounting member and the vibration damping device relating to the eighth to fifteenth aspects of the present invention described above, the mounting member is formed by anchoring the base portion and the crimping piece formed separately from each other, with one such mounting member being overlaid on the bracket to have the crimping piece of the mounting member inserted into the insertion hole of the bracket, while the tip end of the crimping piece is bent to overlay with the bracket from the opposite side of the base portion to be fixed therein. This allows the mounting member to be fixed to the bracket with a light-weight and compact structure with less number of parts, and enables to set the most suitable materials and shape for each of the base portion and the crimping piece.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Embodiments of the present invention will be described below in reference to the drawings.

FIGS. 1 to 4 show a first mounting member 10 for use in a vibration damping device as a first embodiment of the mounting member having a structure according to the first to seventh aspects of the present invention. The first mounting member 10 is provided with a cylindrical joint member 12 of metal serving as a fixing member and an anchoring member 14. The up-down direction in the following descriptions generally indicates the up-down direction in FIG. 2.

Figure 1:
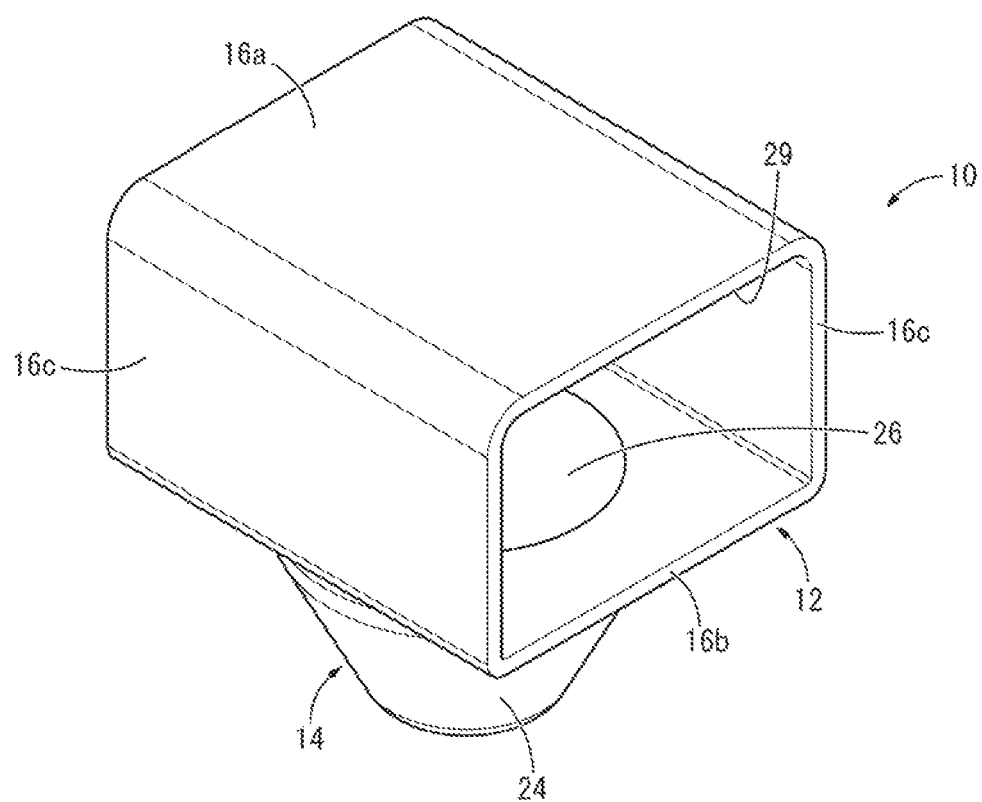
FIG. 1 is a perspective view of a first mounting member as a first embodiment of the present invention.
Figure 2:
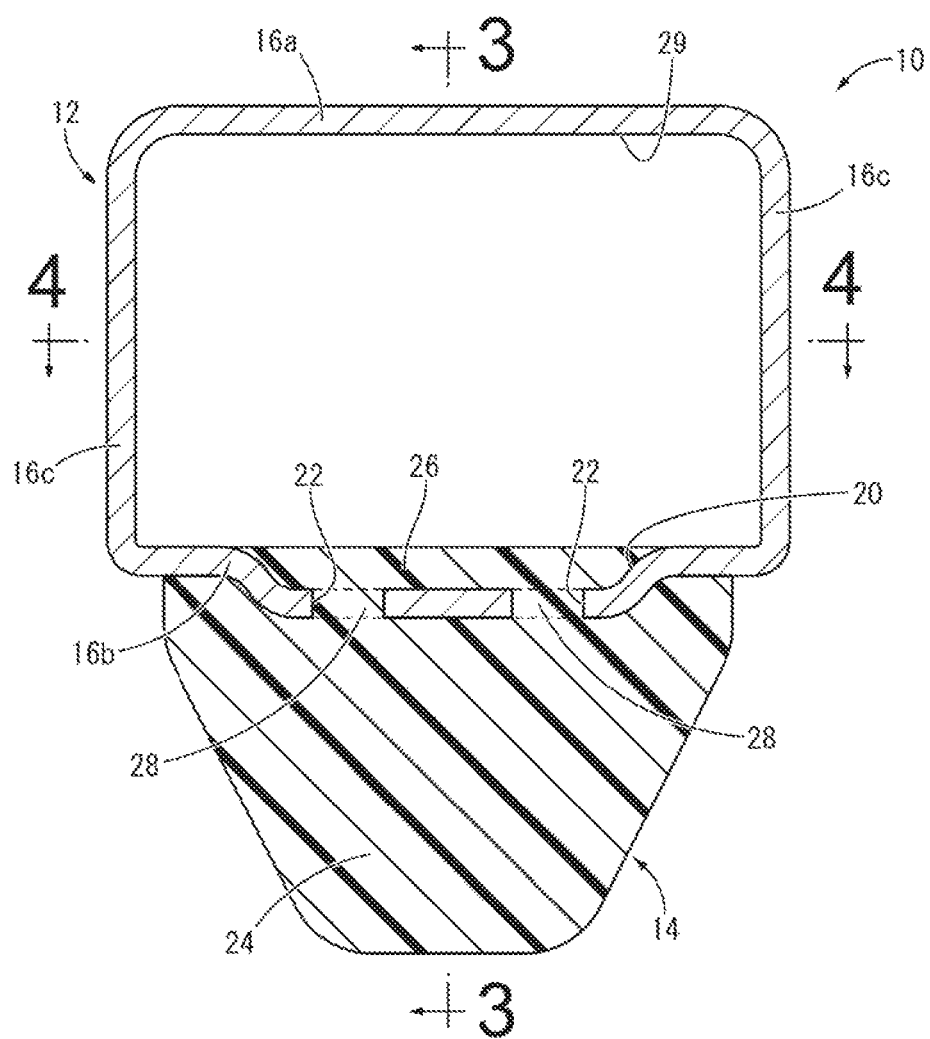
FIG. 2 is a longitudinal cross sectional view of the first mounting member shown in FIG. 1, taken along line 2-2 of FIG. 3.
Figure 3:
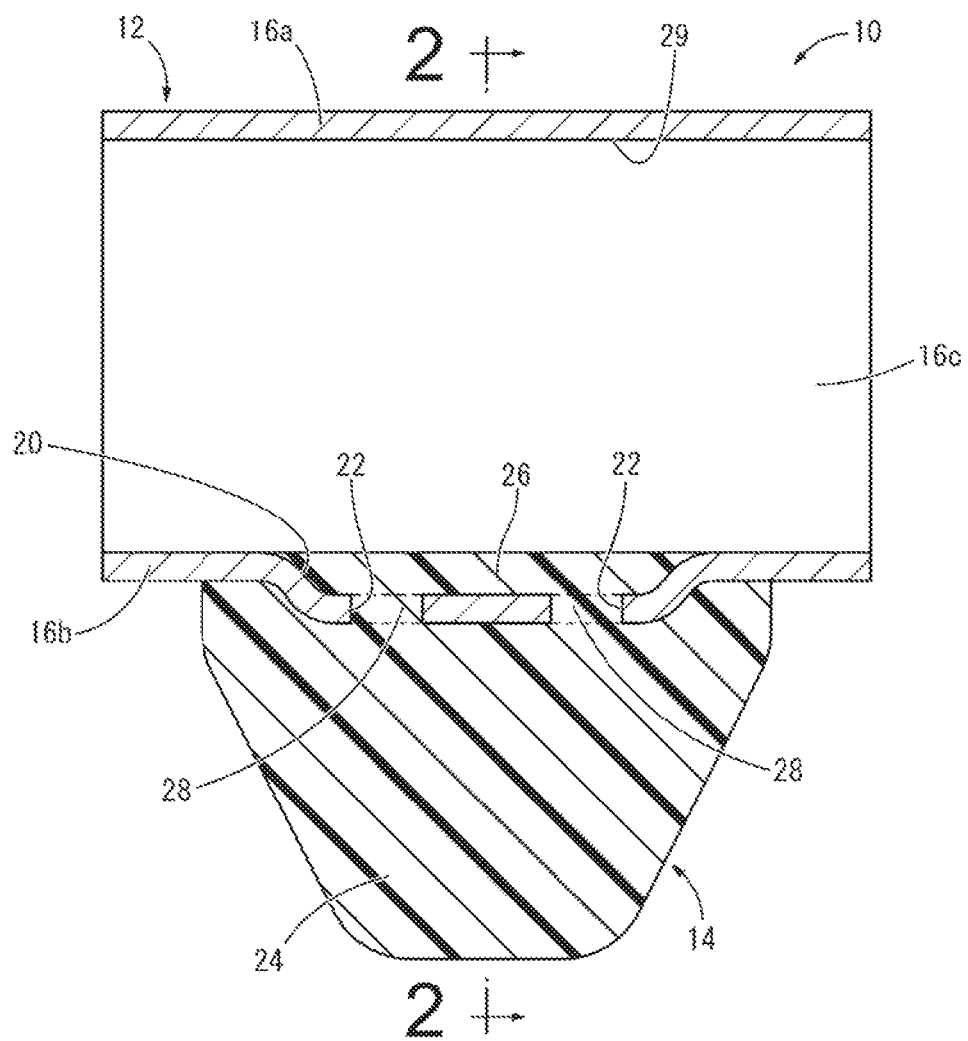
FIG. 3 is a cross sectional view taken along line 3-3 of FIG. 2.
Figure 4:
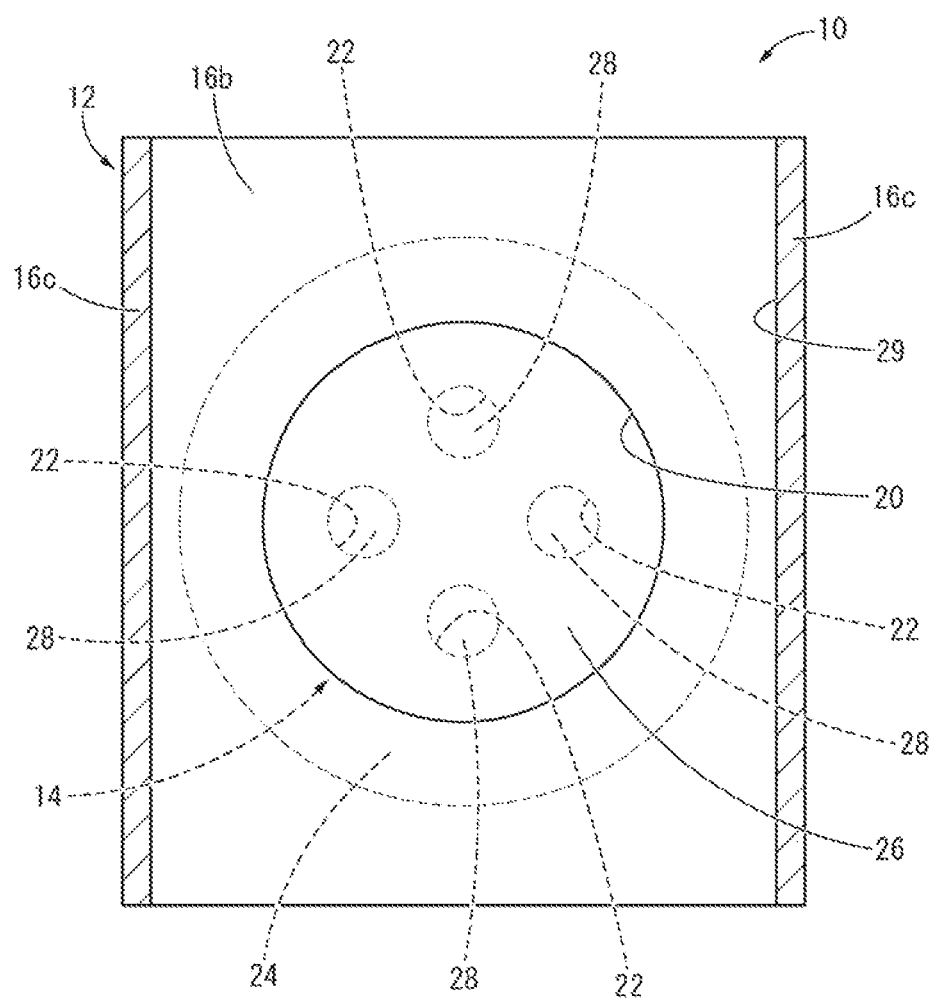
FIG. 4 is a cross sectional view taken along line 4-4 of FIG. 2.

More specifically, the cylindrical joint member 12 is in an approximate shape of a square tube having peripheral wall portions made by connecting an upper wall portion 16a and a lower wall portion 16b by a pair of side wall portions 16c, 16e and is provided with a central hole that penetrates therethrough in the longitudinal direction (left-right direction in FIG. 3). Also, the cylindrical joint member 12 is formed with a metal material such as iron or aluminum alloy, and is molded in a given shape, for example by extrusion or by press work of a metal plate.

Further, a recess 20 is formed in the lower wall portion 16b of the cylindrical joint member 12. The recess 20 opens to the inner peripheral face of the cylindrical joint member 12, that is, the upper face of the lower wall portion 16b, and is made in a circular shape in the vertical view (see FIG. 4). In the present embodiment, the recess 20 is formed during the molding of the cylindrical joint member 12 by press work in a taper form with the diameter increasing toward the opening.

Moreover, a plurality of communication holes 22 are formed in the lower wall portion 16b of the cylindrical joint member 12. The communication holes 22 that are small-diameter circular holes penetrate vertically through the bottom wall portion of the recess 20. In the present embodiment, four communication holes 22, 22, 22, 22 are formed to be arranged in equal intervals along the circumference.

Meanwhile, the anchoring member 14 is formed with rigid synthetic resin into a structure where a main body portion 24 and an engaging part 26 are integrally connected to each other by a plurality of intermediate connecting portions 28. The main body portion 24 is in an approximate shape of a reversed circular truncated cone as a whole provided with an outer peripheral face in a taper form with the diameter decreasing downward.

The engaging part 26 is in an approximate shape of a reversed circular truncated cone nearly corresponding to the recess 20 of the cylindrical joint member 12 with a flat upper face. In addition, the engaging part 26 is located above the main body portion 24, and the main body portion 24 and the engaging part 26 are connected to each other by the plurality of intermediate connecting portions 28.

The intermediate connecting portion 28 is in an approximate shape of a small-diameter circular column corresponding to the communication hole 22 of the cylindrical joint member 12, and the bottom end thereof is made integral with the main body portion 24, while the top end is made integral with the engaging part 26. The intermediate connecting portion 28 is formed in the same number as that of the communication hole 22, that is, four in the present embodiment.

The cylindrical joint member 12 and the anchoring member 14 having the structure described above are fixed to each other. In other words, the upper face of the main body portion 24 of the anchoring member 14 is overlaid and anchored to the bottom face of the lower wall portion 16b of the cylindrical joint member 12, while the bottom face of the engaging part 26 of the anchoring member 14 is overlaid and anchored to the upper face of the lower wall portion 16b of the cylindrical joint member 12. In addition, the intermediate connecting portions 28 of the anchoring member 14 are inserted into the communication holes 22 of the cylindrical joint member 12, and the main body portion 24 and the engaging part 26 of the anchoring member 14 are connected to each other via the communication holes 22 in the arrangement on both sides of the lower wall portion 16b of the cylindrical joint member 12. This allows the anchoring member 14 to be anchored to the lower wall portion 16b of the cylindrical joint member 12 and engaged on top and bottom to be fixed therein.

In the present embodiment, the main body portion 24 of the anchoring member 14 is provided to protrude downward from the lower wall portion 16b of the cylindrical joint member 12, which is part of the circumference thereof, and is to be anchored to the main rubber elastic body 38 in the engine mount 30 described later.

Meanwhile, the engaging part 26 of the anchoring member 14 is put into the recess 20 formed in the lower wall portion 16b of the cylindrical joint member 12 to be anchored thereto, and the engaging part 26 is engaged with the upper face of the lower wall portion 16b (inner face of the recess 20), while the upper face of the engaging part 26 extends on the same plane as the portion outside of the recess 20 on the lower wall portion 16b. This allows the inner face of a fitting hole 29 to be configured where a bracket 74 described later is fitted into by the collaboration between the inner peripheral face of the cylindrical joint member 12 and the upper face of the engaging part 26.

By means of inserting the cylindrical joint member 12 into the anchoring member 14 during the molding thereof, the anchoring member 14 and the cylindrical joint member 12 are anchored to each other rather easily and firmly. More specifically, for example by means of injecting and filling a given resin material into the cavity of metal mold of the anchoring member 14 with the cylindrical joint member 12 set up, the anchoring member 14 can be molded in a state of being anchored to the cylindrical joint member 12.

In the first mounting member 10 having a structure according to the present embodiment, the shape and size of the cylindrical joint member 12 made of metal and those of the anchoring member 14 made of resin are configurable independently from each other. Therefore, the shape, size and deformation rigidity required to stably support the bracket 74 can be set for the cylindrical joint member 12, whereas the shape and size of the anchoring member 14 can be set freely in accordance with the required vibration damping properties and the anchoring area to the main rubber elastic body 38 (described later) while avoiding the limitations due to the shape and size of the cylindrical joint member 12.

Further, excellent deformation rigidity against the load input can be achieved by using the cylindrical joint member 12 made of metal. Meanwhile, the degree of freedom in designing the shape of the cylindrical joint member 12 is improved by using the anchoring member 14 made of resin, thus enabling to highly correspond to the need by the required vibration damping properties and the like. In addition, weight reduction can be pursued by using the anchoring member 14 made of resin.

Also, since the main body portion 24 and the engaging part 26 of the anchoring member 14 are arranged in the upper and lower positions across the lower wall portion 16b, the anchoring member 14 is anchored to and engaged with the lower wall portion 16b of the cylindrical joint member 12, thus achieving stronger fixation.

Moreover, the main body portion 24 and the engaging part 26 of the anchoring member 14 are connected to each other by the intermediate connecting portions 28 via the communication holes 22 formed through the lower wall portion 16b of the cylindrical joint member 12, and the engagement of the anchoring member 14 with the cylindrical joint member 12 is realized even in the structure of the present embodiment where the anchoring member 14 is anchored to the center portion of the lower wall portion 16b. Especially in the present embodiment, since the intermediate connecting portions 28 are provided in plurality arranged in equal intervals on the same circumference, the main body portion 24 and the engaging part 26 are connected more firmly in good balance, thus improving the load bearing capacity at the joint portion between the cylindrical joint member 12 and the anchoring member 14.

Also, the recess 20 is formed in the lower wall portion 16b of the cylindrical joint member 12, and the engaging part 26 of the anchoring member 14 is put into the recess 20 to be fixed thereto, while the upper face of the engaging part 26 is located on approximately the same plane as the upper face outside of the recess 20 on the lower wall portion 16b, and the inner peripheral face of the fitting hole 29 comprises the upper face of the engaging part 26. This prevents the engaging part 26 from protruding from the inner peripheral face of the fitting hole 29, thus simplifying the shape of the fitting hole with no restriction by the engaging part 26.

The first mounting member 10 relating to the present embodiment described above can be adopted to a vibration damping device. An engine mount 30 for motor vehicles, which is a vibration damping device having a structure according to the present invention, will be described below in reference to FIG. 5. The engine mount 30 is provided with a mount main body 39 having a structure where the first mounting member 10 and a second mounting member 36 are elastically connected to each other by a main rubber elastic body 38. In the following paragraphs, since the structure of each part of the first mounting member 10 is identical to the one shown in FIGS. 1 to 4, the description will be omitted by assigning the same reference numbers in the drawings. Also, the "axial direction" generally means a direction of the major vibration input, that is, the up-down direction of the first mounting member 10 represented by the up-down direction in FIGS.

More specifically, the second mounting member 36 is in an approximate shape of a thin and large-diameter circular cylinder provided with a groove-like constriction that opens toward the outer periphery in the upper portion. Then, the first mounting member 10 is arranged separately above the second mounting member 36, and the first mounting member 10 and the second mounting member 36 are elastically connected by the main rubber elastic body 38.

The main rubber elastic body 38 is made in an approximate shape of a thick and large-diameter circular truncated cone, the small-diameter end of which is bonded by vulcanization to the anchoring member 14, while the outer peripheral face of the large-diameter end is bonded by vulcanization to the upper portion of the second mounting member 36. The main rubber elastic body 38 is formed as an integrally vulcanization-molded product provided with the first mounting member 10 and the second mounting member 36.

Further, the main rubber elastic body 38 is formed with a large-diameter recess 40 that opens to the end face on the large-diameter side in the axial direction. The large-diameter recess 40 is made in an approximate shape of a reverse mortar with the diameter increasing downward. Also, a sealing rubber layer 42 extending downward from the peripheral edge of the opening of the large-diameter recess 40 is formed integrally with the main rubber elastic body 38.

Moreover, a rubber sheath layer 44 is adhered to the cylindrical joint member 12 of the first mounting member 10. The rubber sheath layer 44 is a thin rubber layer covering the inner peripheral face of the cylindrical joint member 12 and the upper face of the engaging part 26 of the anchoring member 14, being formed integrally with the main rubber elastic body 38. In the present embodiment, the end face in the length direction and the outer peripheral face of the cylindrical joint member 12 (left and right end faces in FIG. 5) are covered by a rubber layer formed integrally with the main rubber elastic body 38 and the rubber sheath layer 44.

Also, a flexible film 46 is attached to the integrally vulcanization-molded product of the main rubber elastic body 38. The flexible film 46 is a thin rubber membrane in an approximate shape of a circular plate or dome and has some slack on its top and bottom. In addition, a fastener fitting 48 in an annular shape is bonded by vulcanization to the outer peripheral edge of the flexible film 46 and inserted into the lower opening of the second mounting member 36 and fixed thereto in a fluid-tight manner by means of treating the second mounting member 36 with a diameter-reducing process.

By means of attaching the flexible film 46 to the bottom end of the second mounting member 36 in a fluid-tight manner as described above, a fluid chamber 50 is formed between the main rubber elastic body 38 and the flexible film 46 to be filled and sealed with non-compressible fluid. The non-compressible fluid sealed in the fluid chamber 50 is not particularly limited, but for example, water, alkylene glycol, poly-alkylene glycol, silicone oil, and mixed liquid thereof can be used. More favorably, a low-viscosity fluid at 0.1 Pa·s or lower is used in order to effectively obtain the vibration damping performance based on the flow action of the fluid described later.

Also, a partition member 52 is stored and arranged in the fluid chamber 50. The partition member 52 is provided with a cover member 54 and a partition member main body 56. The cover member 54 is a rigid member formed with metal or synthetic resin in an approximate shape of a thin circular disc.

The partition member main body 56 is a rigid member formed with metal or synthetic resin in an approximate shape of a thick circular plate. In addition, a containing recess 58 in a circular shape opening upward is formed at the center of the partition member main body 56 in the radial direction. Further, on the outer periphery edge of the partition member main body 56, a peripheral groove 60 is formed to extend in a circumferential direction opening to the upper and the outer peripheral faces thereof.

Then, the cover member 54 is laid over the upper face of the partition member main body 56 to cover the opening of the containing recess 58 of the partition member main body 56 with the cover member 54, while the upper opening of the peripheral groove 60 of the partition member main body 56 is covered with the cover member 54.

Further, a movable film 62 is stored and arranged in the containing recess 58 with its opening covered with the cover member 54. The movable film 62 is in an approximate shape of a circular plate formed with the main rubber elastic body with its outer peripheral edge protruding on both sides forming an increased thickness all the way around. Then, the movable film 62 is arranged in the containing recess 58 so that the outer peripheral edge with an increased thickness is held between the cover member 54 and the partition member main body 56, while the central portion thereof is allowed to undergo a slight vertical deformation between the cover member 54 and the partition member main body 56.

Then, the partition member 52 is arranged to extend in the transaxial direction within the fluid chamber 50 where its outer peripheral edge is held vertically between the constriction of the second mounting member 36 and the fastener fitting 48, while the outer peripheral face is supported by the second mounting member 36. The space between the outer peripheral face of the partition member 52 and the inner peripheral face of the second mounting member 36 is sealed by the sealing rubber layer 42 in a fluid-tight manner.

This allows the fluid chamber 50 to be divided into the upper and lower portions across the partition member 52, and part of the wall portion is configured by the main rubber elastic body 38 above the partition member 52 to form a pressure-receiving chamber 64 where fluctuations of internal pressure are caused by vibration inputs, whereas part of the wall portion below the partition member 52 is configured by the flexible film 46 to form an equilibrium chamber 66 where volume changes are readily allowed.

Also, the outer peripheral opening of the peripheral groove 60 of the partition member 52 is covered fluid-tight with the second mounting member 36, while both ends of the peripheral groove 60 in the circumferential direction are communicated with each of the pressure-receiving chamber 64 and the equilibrium chamber 66. This forms an orifice passage 68 that communicates the pressure-receiving chamber 64 and the equilibrium chamber 66 to each other using the peripheral groove 60. The orifice passage 68 has its tuning frequency, which is the resonant frequency of the flowing fluid, set by means of adjusting the ratio (A/L) of the cross section area (A) to the length (L) of the passage, for example, to the low frequency at about 10 Hz, which is equivalent to that of the engine shake.

Also, the liquid pressure of the pressure-receiving chamber 64 is applied to the top face of the movable film 62 through an upper through-hole 70, while the liquid pressure of the equilibrium chamber 66 is applied to the bottom face of the movable film 62 through a lower through-hole 72 so that the center portion of the movable film 62 undergoes a slight vertical deformation in accordance with the relative fluctuations of the liquid pressures in the pressure-receiving chamber 64 and the equilibrium chamber 66. This allows the liquid absorption mechanism whereby the liquid pressure of the pressure-receiving chamber 64 is transmitted to the equilibrium chamber 66 to be absorbed therein to comprise the movable film 62. In the present embodiment, the liquid absorption action is efficiently exerted by having the movable film 62 elastically deformed actively in a state of resonance at an input of medium frequency vibration at about a dozen Hz, which is equivalent to that of the idling vibration.

The mount main body 39 having the structure described above is attached with a bracket 74 to make the engine mount 30. The bracket 74 is provided with a fitting part 76 in a solid rod form extending with an approximately square cross section, which roughly corresponds to the inner peripheral configuration of the rubber sheath layer 44 being made slightly larger than that.

Then, the bracket 74 is to be attached to the mount main body 39 by having the fitting part 76 fitted and fixed in the fitting hole 29 of the cylindrical joint member 12 of the first mounting member 10. In the space between the fitting pan 76 of the bracket 74 and the cylindrical joint member 12, the rubber sheath layer 44 is inserted and compressed, but the bracket 74 and the first mounting member 10 are connected with substantial rigidity by means of making the rubber sheath layer 44 thin enough. Although omitted in the drawing, the bracket 74 has an unillustrated mounting part to be mounted to a power unit integrally provided thereto, and the first mounting member 10 is mounted to the power unit via the bracket 74.

According to the engine mount 30 having the first mounting member 10 relating to the present embodiment described above, the mounting strength between the cylindrical joint member 12 and the bracket 74 of the first mounting member 10 is secured sufficiently with enough load bearing capacity. In addition, since the shape and size of the anchoring member 14 of the first mounting member 10 can be set independently from those of the cylindrical joint member 12, improvement to the vibration damping performance can be achieved by means of setting the shape and size of the anchoring member 14 so as to efficiently generate fluctuations of internal pressure in the pressure-receiving chamber 64 in response to the vibration input in the axial direction. The shape of the anchoring member 14 can be set favorably in consideration of the anchoring area to the main rubber elastic body 38 and the free length thereof, whereby the durability is improved.

Also, the inner peripheral face of the fitting hole 29 is covered with the rubber sheath layer 44, and the fitting part 76 of the bracket 74 is inserted into the fitting hole 29 via the rubber sheath layer 44. This avoids deterioration of durability caused by galvanic metal corrosion as well as assembly failure of the bracket 74 caused by metal scoring as opposed to the case where the bracket 74 made of metal is press-fitted in the cylindrical joint member 12 made of metal. Especially in the present embodiment, since the upper face of the engaging part 26 of the anchoring member 14 is located approximately on the same plane as the upper face of the lower wall portion 16b of the cylindrical joint member 12, and the thickness of the rubber sheath layer 44 is made almost constant, the amount of compression of the rubber sheath layer 44 is kept equalized with the bracket 74 attached thereto, thus improving the durability of the parts and stabilizing the support of the bracket 74 due to stress distribution.

FIGS. 6 to 9 show a first mounting member 80 as a second embodiment of the mounting member having a structure according to the first to seventh aspects of the present invention. The first mounting member 80 is provided with a cylindrical joint member 82 of metal serving as a fixing member and an anchoring member 84. In the following paragraphs, descriptions of members and parts that are substantially the same as those of the first embodiment will be omitted by assigning the same reference numbers in the drawings.

The cylindrical joint member 82 is in an approximate shape of a square tube as a whole with a structure where an upper wall portion 86a and a lower wall portion 86b are integrally connected to each other by a pair of side wall portions 86c, 86c. In the cylindrical joint member 82 of the present embodiment, the lower wall portion 86b is made in a flat shape without the recess 20, while the lower wall portion 86b is provided with the plurality of communication holes 22 penetrating through the center thereof.

Like the anchoring member 14 of the first embodiment, the anchoring member 84 is a rigid member formed with synthetic resin into a structure where a main body portion 90 and an engaging part 92 are integrally connected. The main body portion 90, as is the case with the first embodiment, is in a taper form with the diameter gradually decreasing downward, while its upper end is made flat in lack of the recess 20 on the lower wall portion 86b. Meanwhile, the engaging part 92 is made in an approximate shape of an elongated rectangular plate extending continuously all along the length of the lower wall portion 86b.

Then, the main body portion 90 and the engaging pan 92 are connected to each other by the plurality of intermediate connecting portions 28, while being connected to each other by a pair of outer connecting portions 94, 94. The pair of outer connecting portions 94, 94, integrally formed with the main body portion 90 and the engaging part 92, are arranged so as to connect the upper outer peripheral face of the main body portion 90 and the end face of the engaging part 92 in the length direction on both sides of the engaging part 92 in the length direction (left-right direction in FIG. 8).

The anchoring member 84 having the structure described above is fixed to the cylindrical joint member 82. In other words, the main body portion 90 of the anchoring member 84 is overlaid and fixed to the bottom face of the lower wall portion 86b of the cylindrical joint member 82, while the engaging part 92 of the anchoring member 84 is overlaid and fixed to the upper face of the lower wall portion 86b of the cylindrical joint member 82. In addition, the main body portion 90 and the engaging part 92 of the anchoring member 84 are connected integrally to each other by the plurality of intermediate connecting portions 28 and the pair of outer connecting portions 94, 94 to be fixed by having the anchoring member 84 anchored to and engaged with the cylindrical joint member 82. In the structure relating to the present embodiment, as is the case with the first embodiment, the cylindrical joint member 82 and the anchoring member 84 are easily fixed by means of inserting the cylindrical joint member 82 into the anchoring member 84 during its injection molding.

Figure 8:
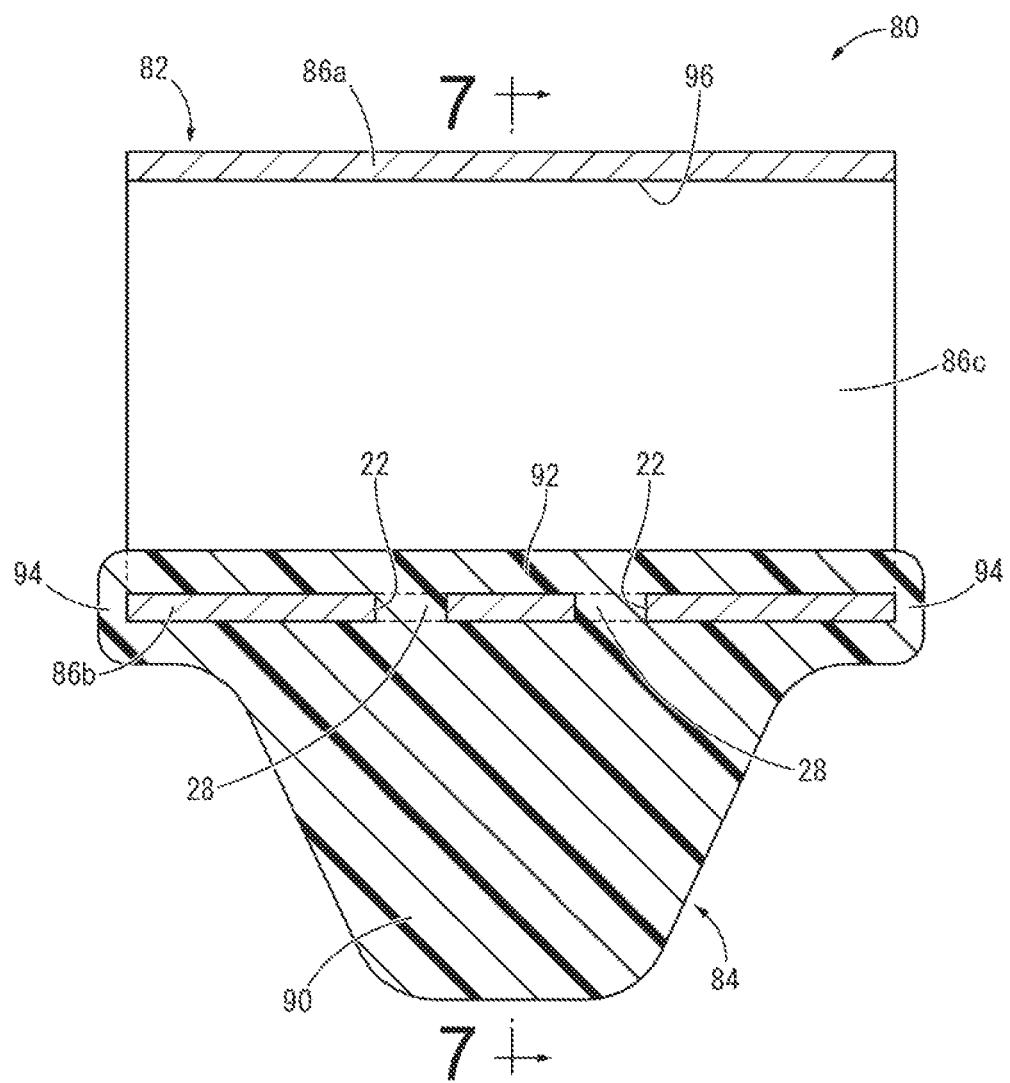
FIG. 8 is a cross sectional view taken along line 8-8 of FIG. 7.
Figure 9:
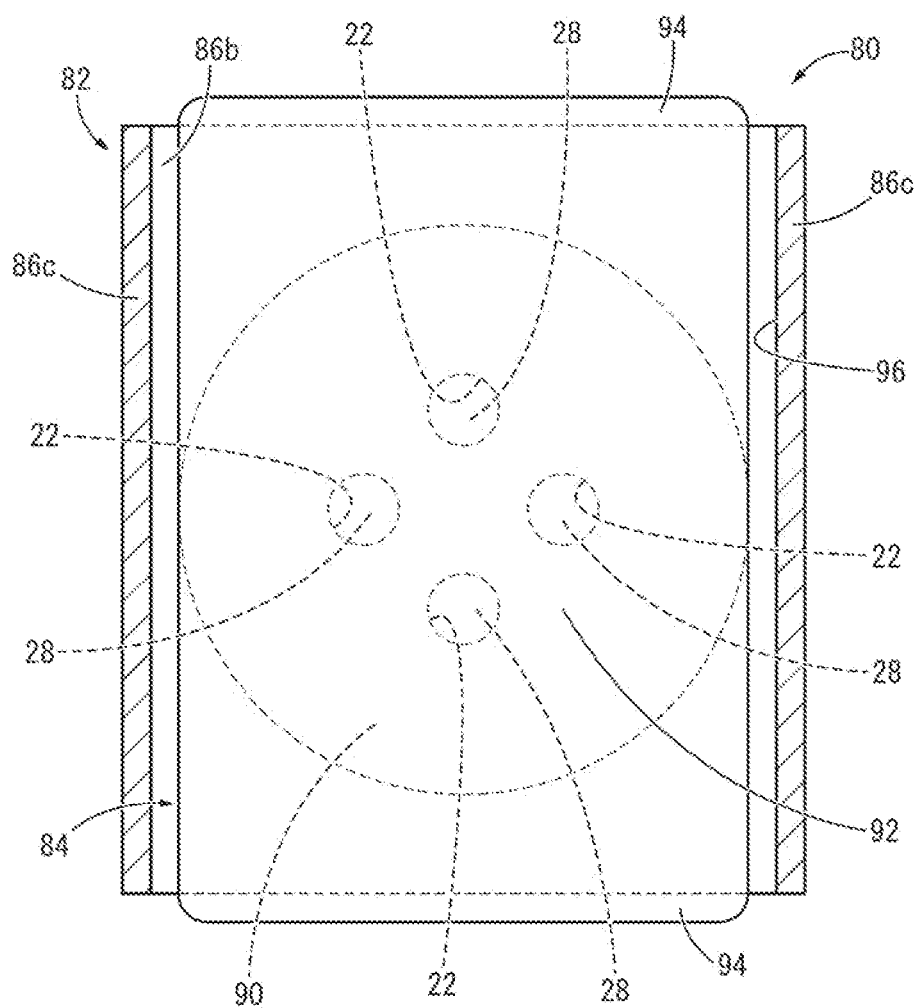
FIG. 9 is a cross sectional view taken along line 9-9 of FIG. 7.

Also, as shown in FIG. 8, the pair of outer connecting portions 94, 94 are formed around the outer edge of the lower wall portion 86b outside the opening of the cylindrical joint member 82 to be anchored to the end face of the cylindrical joint member 82 in the length direction and the bottom face of the end portion thereof in the same direction. This allows the cylindrical joint member 82 and the anchoring member 84 to be connected to each other by the plurality of intermediate connecting portions 28 in the middle of the length direction of the cylindrical joint member 82, while being connected to each other by the pair of outer connecting portions 94, 94 at both ends thereof in the length direction.

In the present embodiment, the engaging part 92 of the anchoring member 84 is provided to protrude upward from the upper face of the lower wall portion 86b of the cylindrical joint member 82, and the cylindrical joint member 82 and the engaging pan 92 collaborate with each other to form a fitting hole 96.

The first mounting member 80 having the structure according to the present embodiment is provided with the pair of outer connecting portions 94, 94 in addition to the plurality of intermediate connecting portions 28, and the main body portion 90 and the engaging part 92 of the anchoring member 84 are connected to each other not only in the middle portion but also at both ends in the length direction. Therefore, filling failure of the synthetic resin material in molding the anchoring member is effectively prevented, while making a stronger connection between the main body portion 90 and the engaging part 92. Meanwhile, the main body portion 90 and the engaging part 92 can be connected only by the pair of outer connecting portions 94, 94 omitting the intermediate connecting portions 28 of the anchoring member 84 and the communication holes 22 of the cylindrical joint member 82.

Further, although the recess 20 is not provided in the lower wall portion 86b of the cylindrical joint member 82 while the engaging part 92 of the anchoring member 84 protrudes upward from the upper face of the lower wall portion 86b, the engaging part 92 extends continuously all the way in the length direction of the lower wall portion 86b, while being provided to cover a wide area almost over the entire length in the width direction. This allows the rubber sheath layer 44 covering the inner peripheral face of the fitting hole 96 to be compressed in nearly equal manner substantially in its entirety, thus effectively achieving both stable support of the bracket 74 and secured durability of the rubber sheath layer 44.

In addition, since the anchoring area between the anchoring member 84 and the cylindrical joint member 82 is secured large enough, abrasion and damages of the anchoring member 84 can be prevented at the anchoring part between the cylindrical joint member 82 and the anchoring member 84 where stresses tend to be concentrated, thus securing enough durability of the parts.

Figure 10:
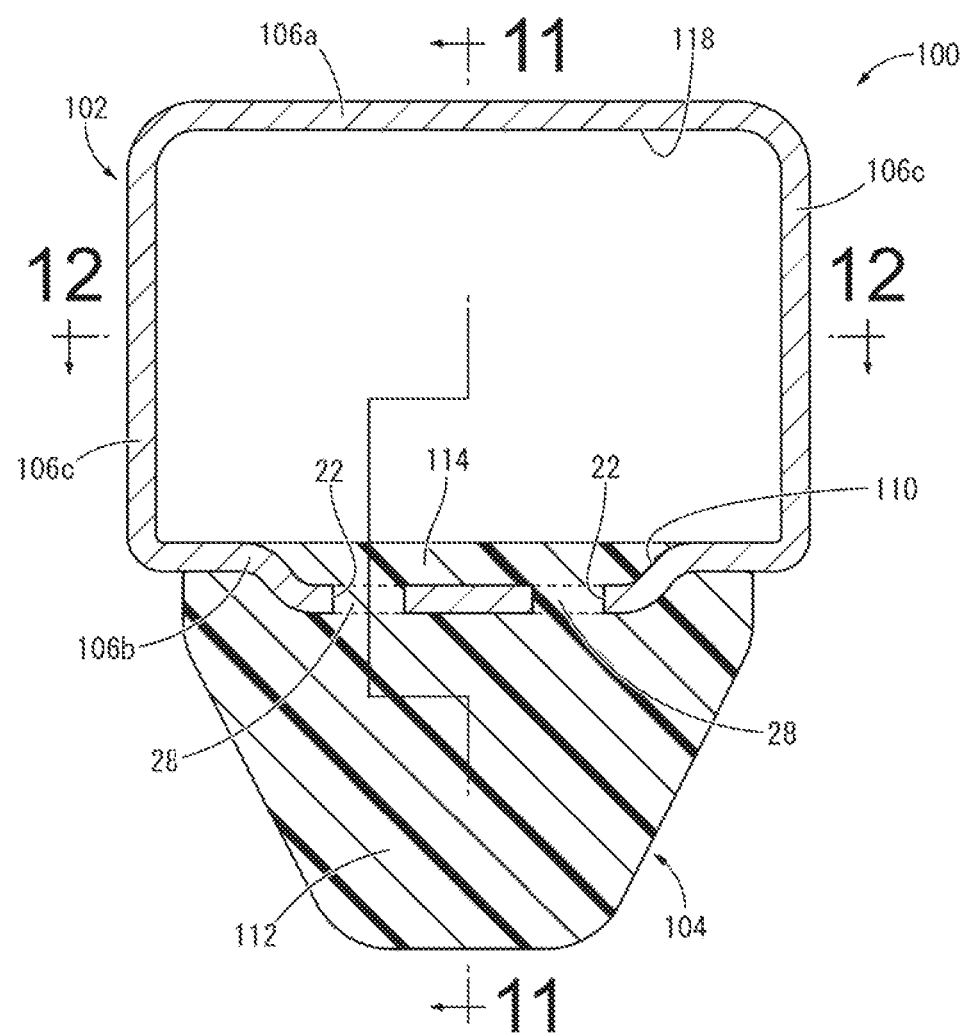
FIG. 10 is a longitudinal cross sectional view of a first mounting member as a third embodiment of the present invention, taken along line 10-10 of FIG. 11.
Figure 11:
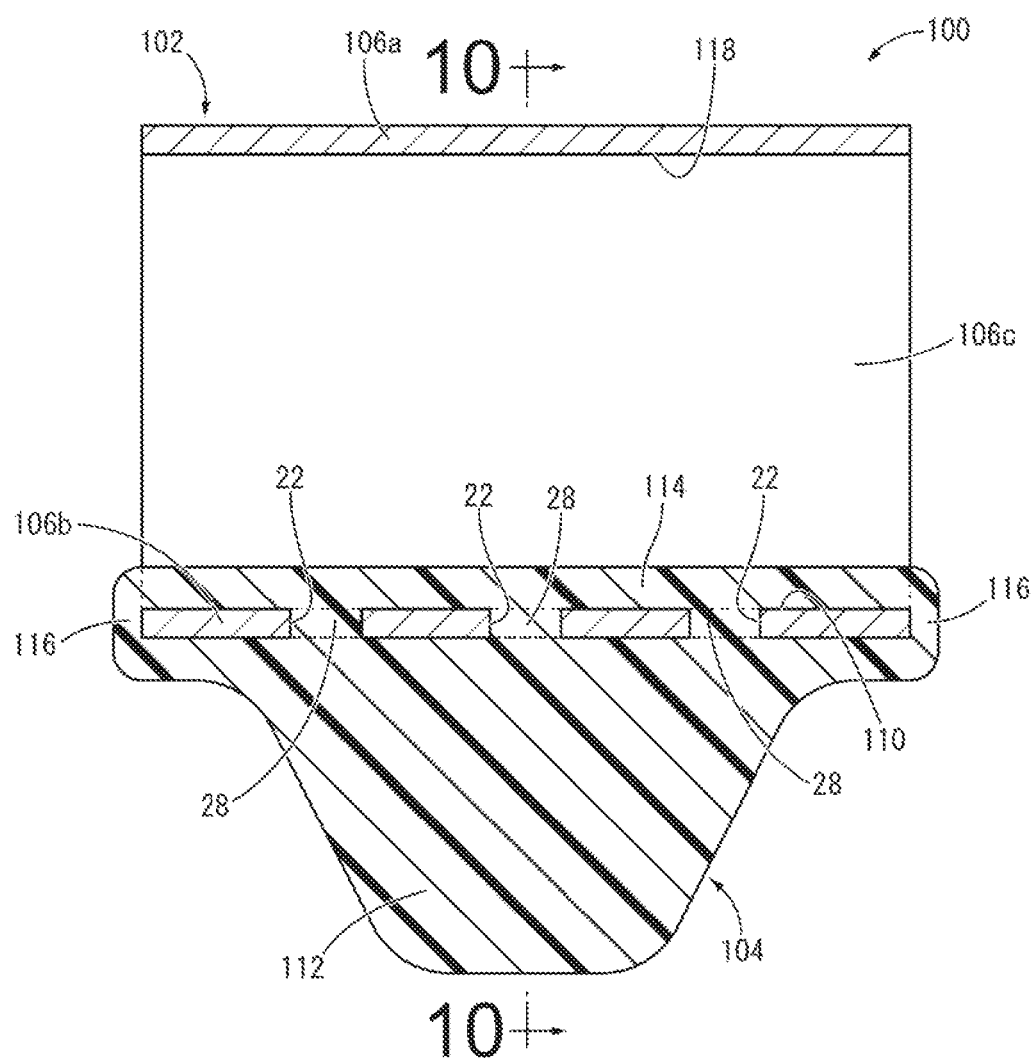
FIG. 11 is a cross sectional view taken along line 11-11 of FIG. 10.
Figure 12:
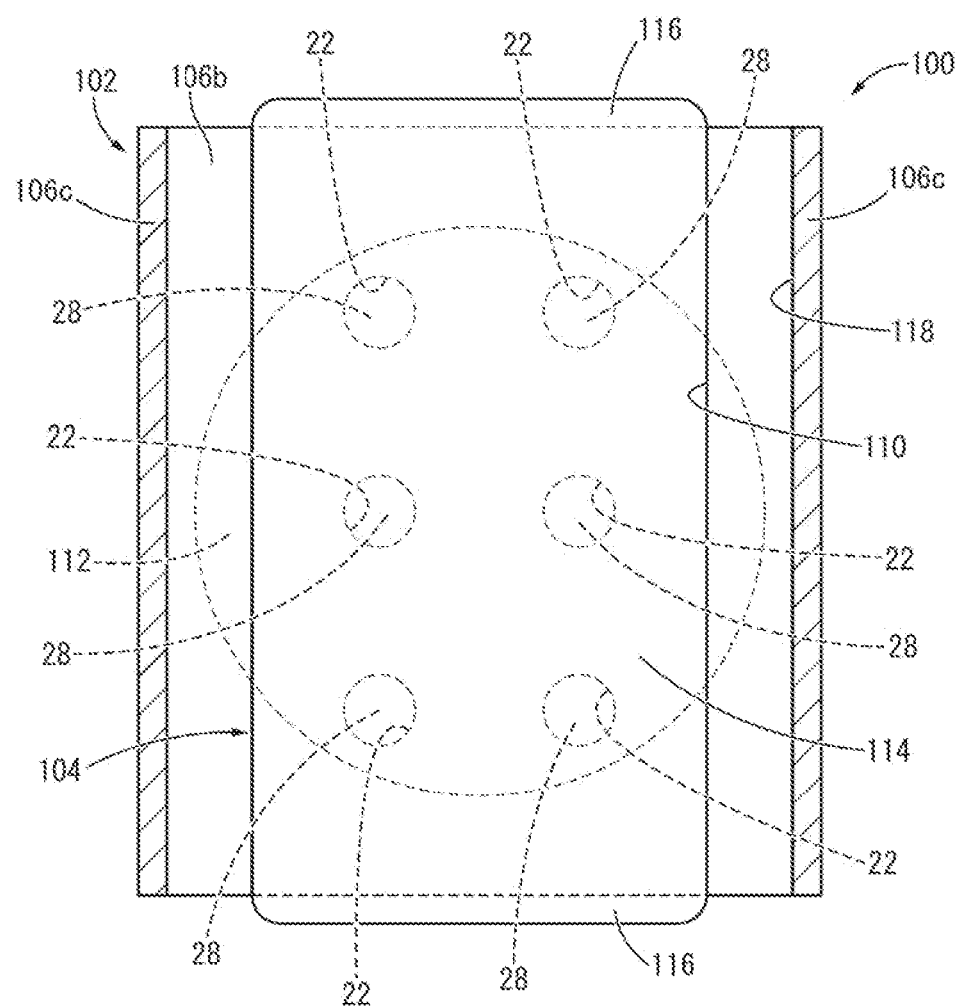
FIG. 12 is a cross sectional view taken along line 12-12 of FIG. 10.

FIGS. 10 to 12 show a first mounting member 100 as a third embodiment of the mounting member having a structure according to the first to seventh aspects of the present invention. The first mounting member 100 is provided with a cylindrical joint member 102 of metal serving as a fixing member and an anchoring member 104.

More specifically, the cylindrical joint member 102 is a high-rigidity member formed with metal such as iron or aluminum alloy in an approximate shape of a square tube as a whole having a structure where an upper wall portion 106a and a lower wall portion 106b are integrally connected to each other by a pair of side wall portions 106c, 106c.

Also, a concave groove 110 is formed in the lower wall portion 106b of the cylindrical joint member 102 and serves as a recess that opens to the upper face thereof. The concave groove 110, formed with a groove section gradually widening toward the opening, extends continuously all the way in the length direction on the center in the width direction of the lower wall portion 106b. The bottom face of the concave groove 110 has six communication holes 22, . . . , 22 penetrating therethrough.

Meanwhile, the anchoring member 104 is a rigid member formed with synthetic resin integrally provided with a main body portion 112 and an engaging part 114. The main body portion 112, as in the embodiments described above, is in an approximate shape of a reverse circular truncated cone with the diameter gradually decreasing downward. The engaging part 114 is formed in a rectangular shape nearly corresponding to the groove form of the concave groove 110 of the cylindrical joint member 102

The main body portion 112 and the engaging part 114 are integrally connected to each other at each midpoint with the plurality of intermediate connecting portions 28, while its both ends in the length direction are integrally connected to each other by a pair of outer connecting portions 116, 116. The outer connecting portion 116 of the present embodiment is made narrower than the outer connecting portion 94 of the second embodiment.

Then, the cylindrical joint member 102 and the anchoring member 104 are fixed to each other as is the case with the embodiments described above. In the present embodiment, the engaging part 114 of the anchoring member 104 is anchored to the inner face of the concave groove 110 of the cylindrical joint member 102. Besides, the main body portion 112 and the engaging part 114 of the anchoring member 104 are connected to each other at the intermediate connecting portions 28 and the outer connecting portions 116. By so doing, the anchoring member 104 is engaged and anchored with the cylindrical joint member 102 so that the anchoring member 104 protrudes downward from the cylindrical joint member 102.

In the present embodiment, the engaging pan 114 is contained in the concave groove 110 of the lower wall portion 106b of the cylindrical joint member 102, and the inner peripheral face of a fitting hole 118 is configured by collaboration between the inner peripheral face of the cylindrical joint member 102 outside the concave groove 110 and the upper face of the engaging part 114.

Using the first mounting member 100 having the structure according to the present embodiment, the same effect as that of the first embodiment can be obtained. In addition, since the main body portion 112 and the engaging part 114 of the anchoring member 104 are connected to each other not only by the plurality of intermediate connecting portions 28 but also by the pair of outer connecting portions 116, 116, a firm connection is achieved as is the case with the second embodiment.

Also, since the cylindrical joint member 102 of the present embodiment has the concave groove 110 extending all the way in the length direction of the lower wall portion 106b and the engaging part 114 is anchored to the concave groove 110 in a state of being contained therein, the upper face of the engaging part 114 is located on approximately the same plane as the upper face of the lower wall portion 106b, thus improving the durability of the rubber sheath layer 44 during its application to a vibration damping device as is the case with the first embodiment.

Figure 5:
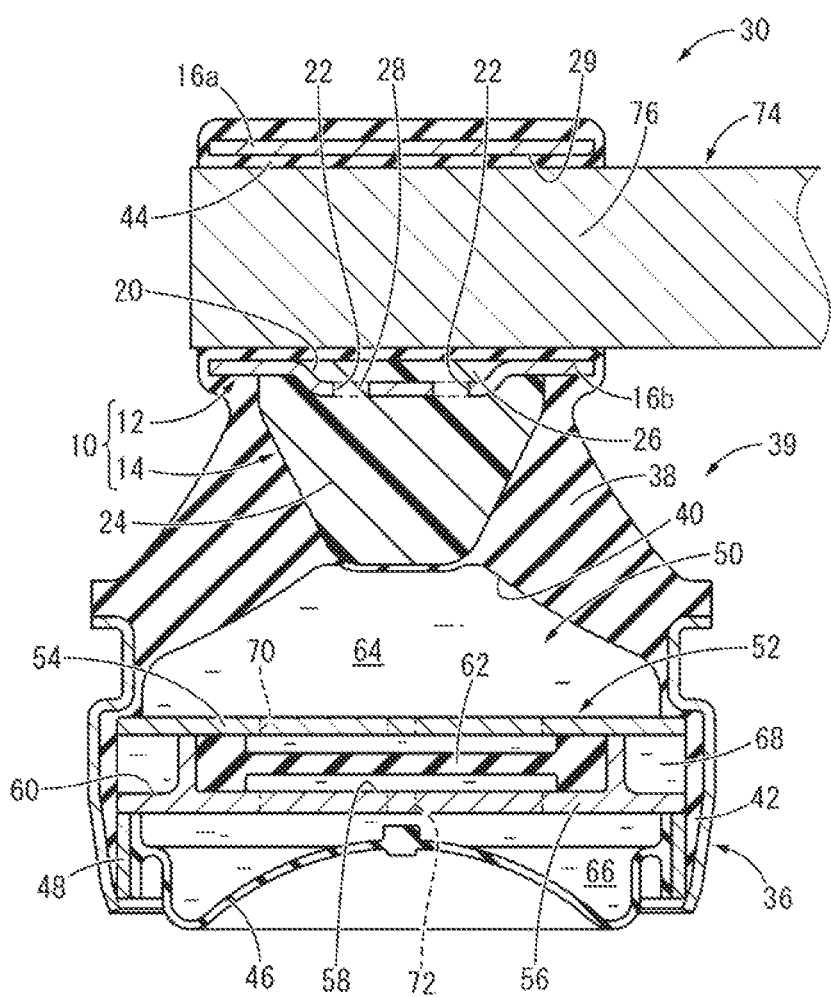
FIG. 5 is a longitudinal cross sectional view of an engine mount equipped with the first mounting member shown in FIG. 1.
Figure 6:
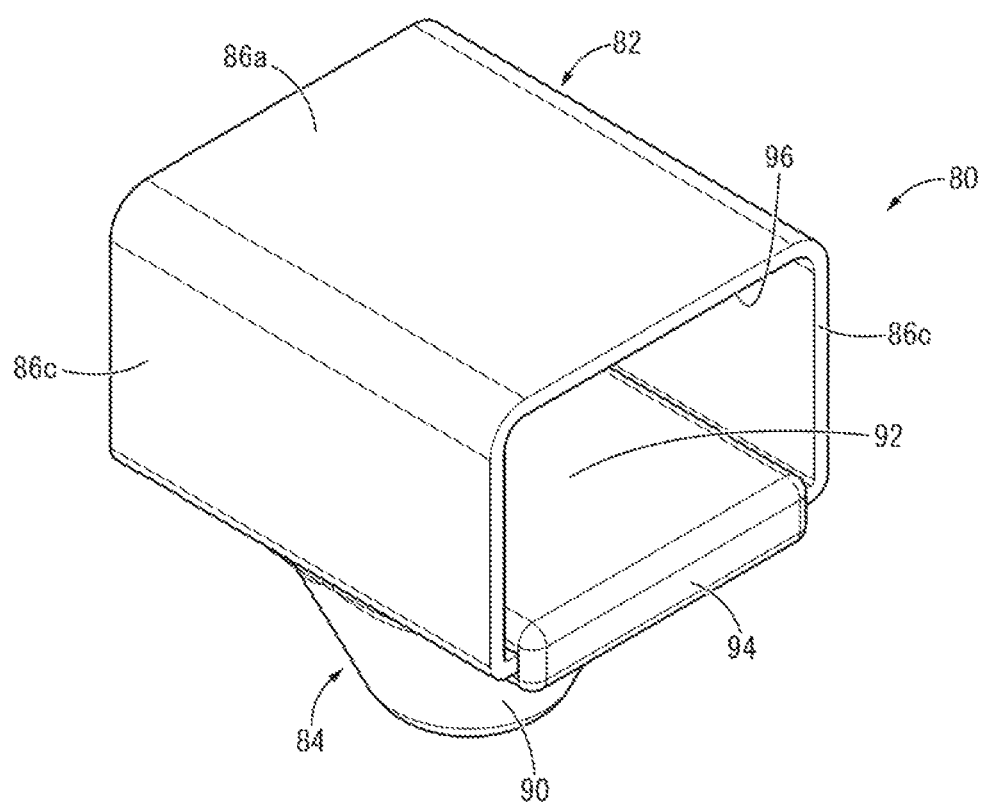
FIG. 6 is a perspective view of a first mounting member as a second embodiment of the present invention.
Figure 7:
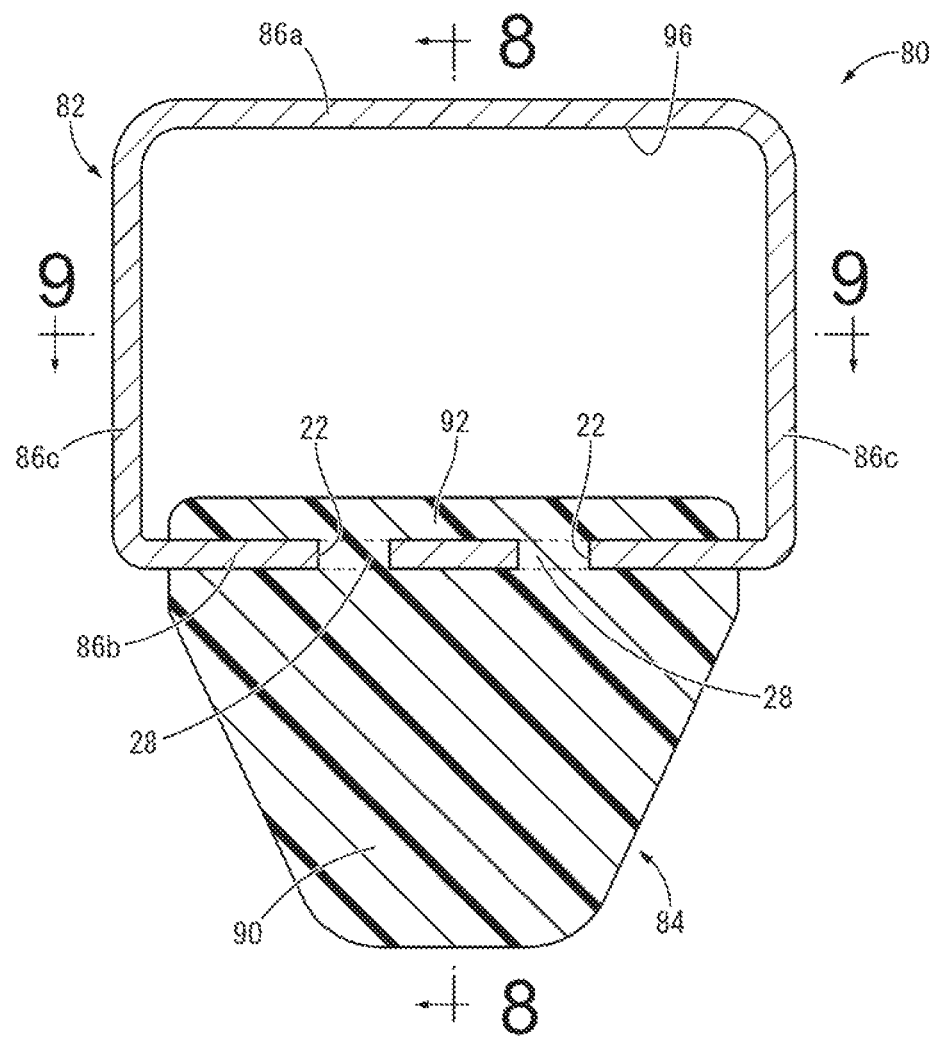
FIG. 7 is a longitudinal cross sectional view of the first mounting member shown in FIG. 6, taken along line 7-7 of FIG. 8.

The first mounting members 80, 100 shown in the second and third embodiments can be applied to the engine mount 30 shown in FIG. 5 in lieu of the first mounting member 10 of the first embodiment. However, the engine mount 30 is just an example of the vibration damping device relating to the present invention, and the first mounting members 10, 80 and 100 shown in the first to third embodiments are applicable to other vibration damping devices different from the engine mount 30 (e.g. a solid vibration damping device which is not fluid-filled type).

Embodiments of the present invention relating to the first to seventh aspects have been described above, but the specific descriptions of these first to third embodiments do not limit the present invention. For example, the cross sectional shape of the cylindrical joint member is not particularly limited as long as it is cylindrical, and a cylindrical shape with an oval or irregular cross section can also be adopted.

Also, even in the structure where the engaging part 26 of the anchoring member 14 is anchored to the center of the lower wall portion 16b of the cylindrical joint member 12 as in the first embodiment, it is possible to omit the recess 20, and the engaging part can protrude upward beyond the upper face of the lower wall portion of the cylindrical joint member.

Also, in the first embodiment, the anchoring member 14 is structured to be locked into the cylindrical joint member 12, being provided with the main body portion 24 and the engaging part 26, but as long as the anchoring strength between the anchoring member and the cylindrical joint member can be secured sufficiently, the anchoring member can be configured only with the main body portion 24, for example, to be anchored to the outer peripheral face of the cylindrical joint member 12.

Figure 13:
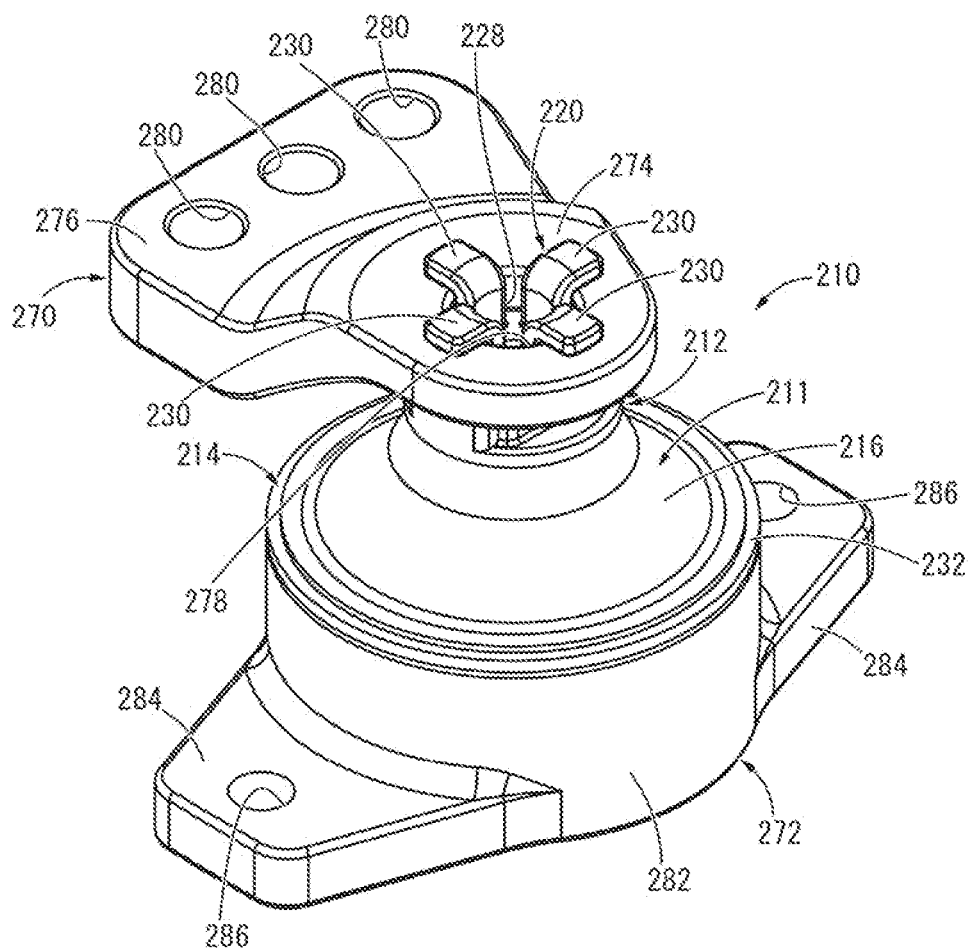
FIG. 13 is a perspective view of an engine mount as a fourth embodiment of the present invention.
Figure 14:
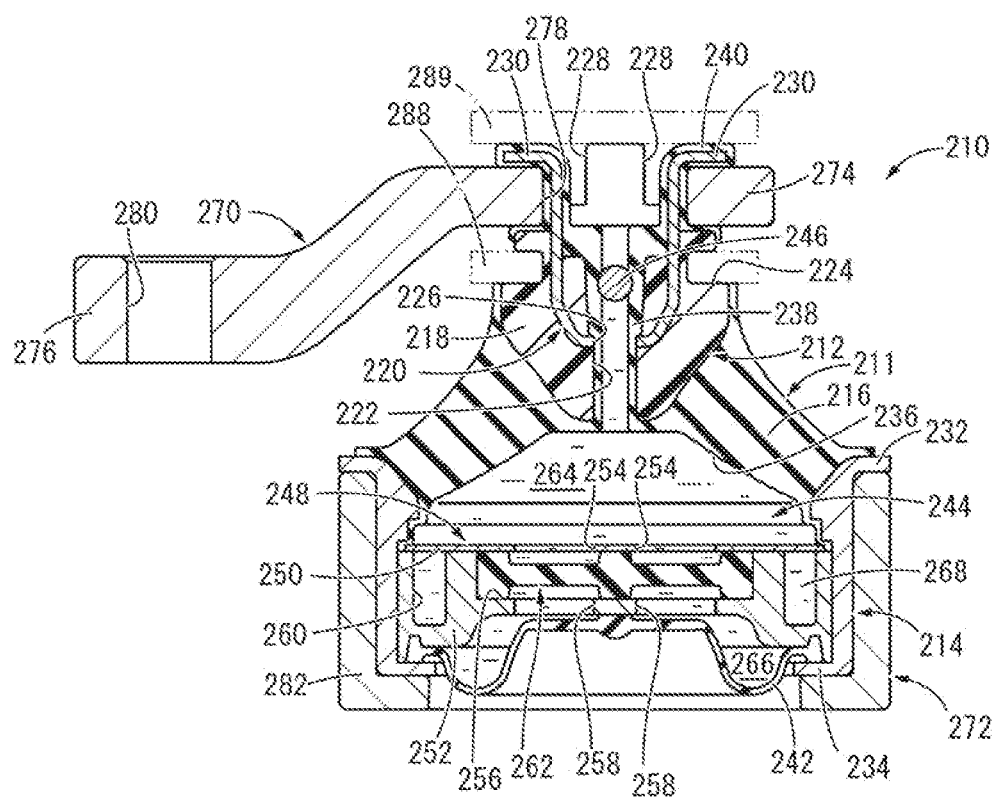
FIG. 14 is a longitudinal cross sectional view of the engine mount shown in FIG. 13.

Now. FIGS. 13 and 14 show, as a fourth embodiment of the present invention, an engine mount 210 for motor vehicles representing an embodiment pertaining to the mounting member of the present invention relating to the eighth to fifteenth aspects described above and a vibration damping device using it. The engine mount 210 is provided with a mount main body 211 having a structure where a first mounting member 212 and a second mounting member 214 are elastically connected by a main rubber elastic body 216. In the following descriptions, the up-down direction generally means the up-down direction in FIG. 14, which is the axial direction of the engine mount.

More specifically, the first mounting member 212 has a structure where a base portion 218 serving as an anchoring member and a cylindrical member 220 serving as a fixing member are anchored to each other. The base portion 218 is formed with rigid synthetic resin in a block form extending in the up-down direction in an approximately circular cross section with its lower portion in a taper form with the diameter gradually decreasing downward. Further, a filler hole 222 is formed in the base portion 218 extending in the up-down direction on the central axis, both ends of which open respectively to the top and bottom faces of the base portion 218. Moreover, a pair of concave grooves 224, 224 are formed in the upper part of the base portion 218 opening to the outer peripheral face thereof, which are arranged to face each other in the radial direction.

Figure 15:
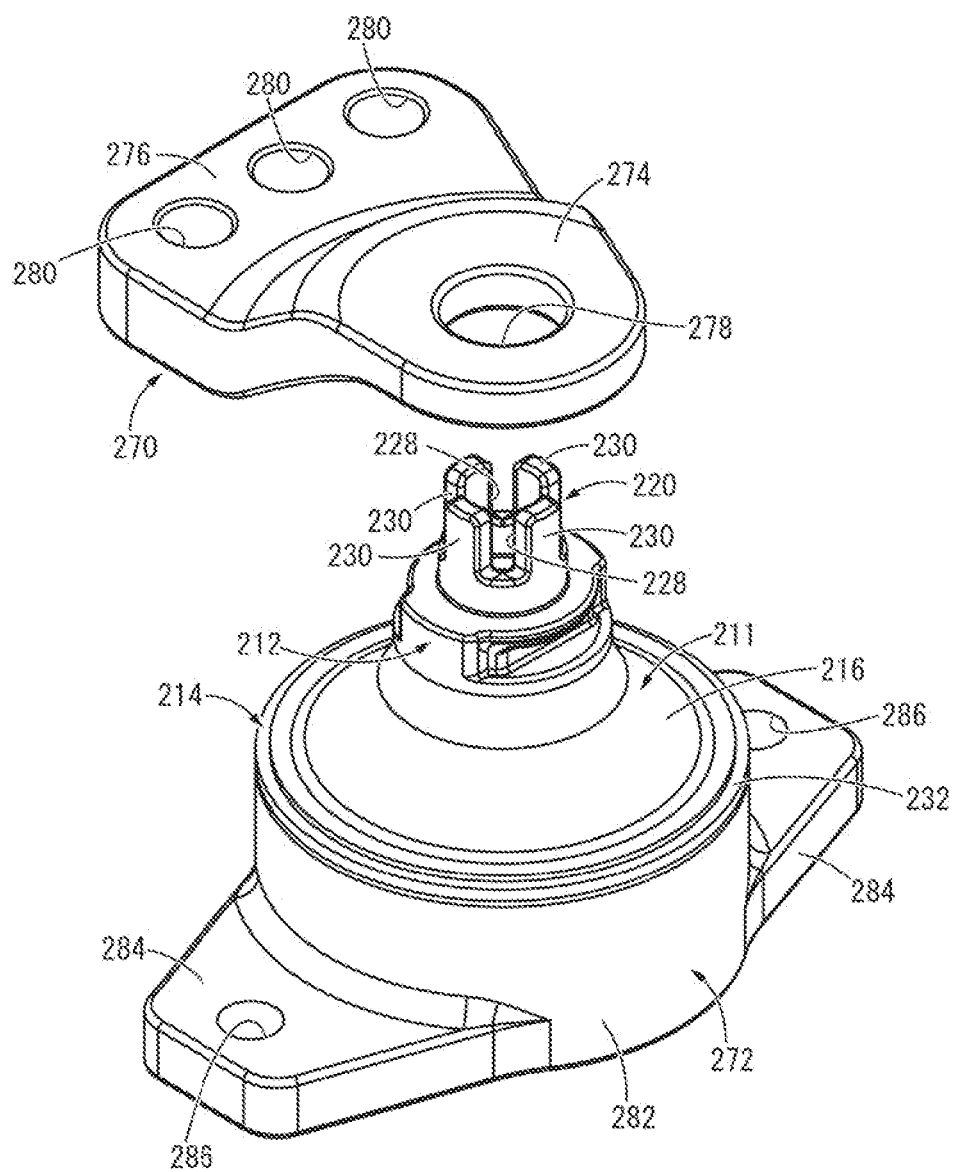
FIG. 15 is an exploded perspective view of the engine mount shown in FIG. 13 before attachment of a first mounting member and a first bracket.

Also, the cylindrical member 220 is formed separately from the base portion 218 with metal such as iron in an approximate shape of a bottomed circular cylinder. Further, a through hole 226 is formed in the bottom wall portion of the cylindrical member 220 penetrating through the center thereof. Moreover, the upper portion of the cylindrical member 220, as shown in FIG. 15, is divided in the circumferential direction by a plurality of cutouts 228 reaching the top edge where a plurality of crimping pieces 230 are arranged along the circumference on both sides of each cutout 228. In the present embodiment, four crimping pieces 230 in approximately the same shape are equally arranged along the circumference. The cylindrical member 220 can easily be obtained, for example, by pressing and grinding an iron plate.

Then, the lower portion of the cylindrical member 220 is anchored to the base portion 218 so that the base portion 218 protrudes downward from the cylindrical member 220, while the crimping piece 230 constituting the upper portion of the cylindrical member 220 protrudes upward from the middle of the base portion 218 in the radial direction. The base portion 218 and the cylindrical member 220 can be anchored by means of adhesion after each formation but the base portion 218 and the cylindrical member 220 can be anchored to each other at the same time as forming the base portion 218, for example by means of setting the cylindrical member 220 in the cavity of the metal molding during the formation of the base portion 218 so as to form the base portion 218 with the cylindrical member 220 inserted therein. By aligning the through hole 226 of the cylindrical member 220 with the filler hole 222 of the base portion 218, the filler hole 222 is formed continuously in the up-down direction via the through hole 226. Also, the concave groove 224 is formed at a depth short of reaching the cylindrical member 220.

The first mounting member 212 of the present embodiment having the structure described above constitutes the fluid-filled mount main body 211 by means of being elastically connected to the second mounting member 214 by the main rubber elastic body 216, and the basic structure of the mount main body 211 is made substantially the same as that of the first embodiment shown in FIG. 5 described above. This allows those skilled in the art to easily understand the structure in reference to the first embodiment described above based on FIG. 14.

In other words, the second mounting member 214 of the present embodiment is made of metal in a circular cylindrical shape, wherein a flange portion 232 and an inner flange portion 234 are integrally formed at the top and bottom ends. Then, the first mounting member 212 and the second mounting member 214 arranged at a distance on the same central axis are elastically connected by the main rubber elastic body 216 to make an integrally vulcanization-molded product. Also, the upper and lower openings of the second mounting member 214 are covered with the main rubber elastic body 216 and a flexible film 242 to form a fluid chamber 244 containing non-compressible fluid sealed therein. This fluid chamber 244 is vertically partitioned with a partition member 248 that is held and fixed its outer periphery with the second mounting member 214, while, between a cover member 250 constituting the partition member 248 and a partition member main body 252, a containing recess 256 is formed by means of covering the containing recess 256 of the partition member main body 252 with the cover member 250 so as to store and arrange a movable film 262 therein.

By arranging the partition member 248 within the fluid chamber 244 as described above, a pressure-receiving chamber 264 and an equilibrium chamber 266 are formed above and below the partition member 248, respectively. Also, a plurality of through holes 254, 258 are formed in each of the upper and lower wall portions of the containing recess 256 so that the pressures in the pressure-receiving chamber 264 and the equilibrium chamber 266 are applied to the top and bottom faces of a movable film 262. Further, an orifice passage 268 is formed to communicate the pressure-receiving chamber 264 and the equilibrium chamber to each other by having a peripheral groove 260 extending in the circumferential direction along the outer periphery of the containing recess 256 covered by the cover member 250.

Under these circumstances, the filler hole 222 of the first mounting member 212 opens on the top wall portion of a large-diameter recess 236 of the main rubber elastic body 216, while the inner peripheral face of the filler hole 222 is covered with a rubber layer 238 integrally formed with the main rubber elastic body 216. On the wall of the fluid chamber 244, the bottom end of the filler hole 222 opens up, whereas the upper end thereof is communicated with the exterior via the filler hole 222 that opens to the inner peripheral side of the cylindrical member 220. Then, non-compressible liquid is poured into the fluid chamber 244 via the filler hole 222, while the filler hole 222 is sealed fluid-tight by fitting a spherical plug 246 into the filler hole 222 after the non-compressible fluid is poured in so that the non-compressible fluid is sealed in the fluid chamber 244. Meanwhile, the crimping piece 230 of the first mounting member 212 is entirely covered with a rubber sheath layer 240 integrally formed with the main rubber elastic body 216.

The mount main body 211 having the structure described above has the first mounting member 212 with a first bracket 270 attached thereto serving as a bracket as well as the second mounting member 214 with a second bracket 272 attached thereto.

The first bracket 270 is a high-rigidity member formed with metal such as iron or aluminum alloy and is integrally provided with a connection plate 274 to be attached to the first mounting member 212 and a mounting part 276 to be attached to an unillustrated power unit. Also, in the connection plate 274, an insertion hole 278 is formed penetrating therethrough in the thickness direction with an approximately consistent circular cross section. Further, in the mounting part 276, a plurality of bolt holes 280 are formed penetrating therethrough in the up-down direction.

The second bracket 272 is a high-rigidity member just like the first bracket 270 and integrally provided with a fitting cylindrical portion 282 in an approximate shape of a circular cylinder to be attached to the second mounting member 214 and a pair of mounting parts 284, 284 protruding from the fitting cylindrical portion 282 to be attached to an unillustrated vehicular body. A bolt hole 286 is formed in each of the pair of mounting parts 284, 284.

Then, the first bracket 270 is fixed to the first mounting member 212, while the fitting cylindrical portion 282 of the second bracket 272 is fitted from outside to be fixed to the second mounting member 214. The fitting cylindrical portion 282 of the second bracket 272 has its top face overlaid to the flange portion 232 of the second mounting member 214 from below, while its bottom face protrudes toward the inner periphery thereof to overlay with the inner flange portion 234 of the second mounting member 214 from below.

Figure 16:
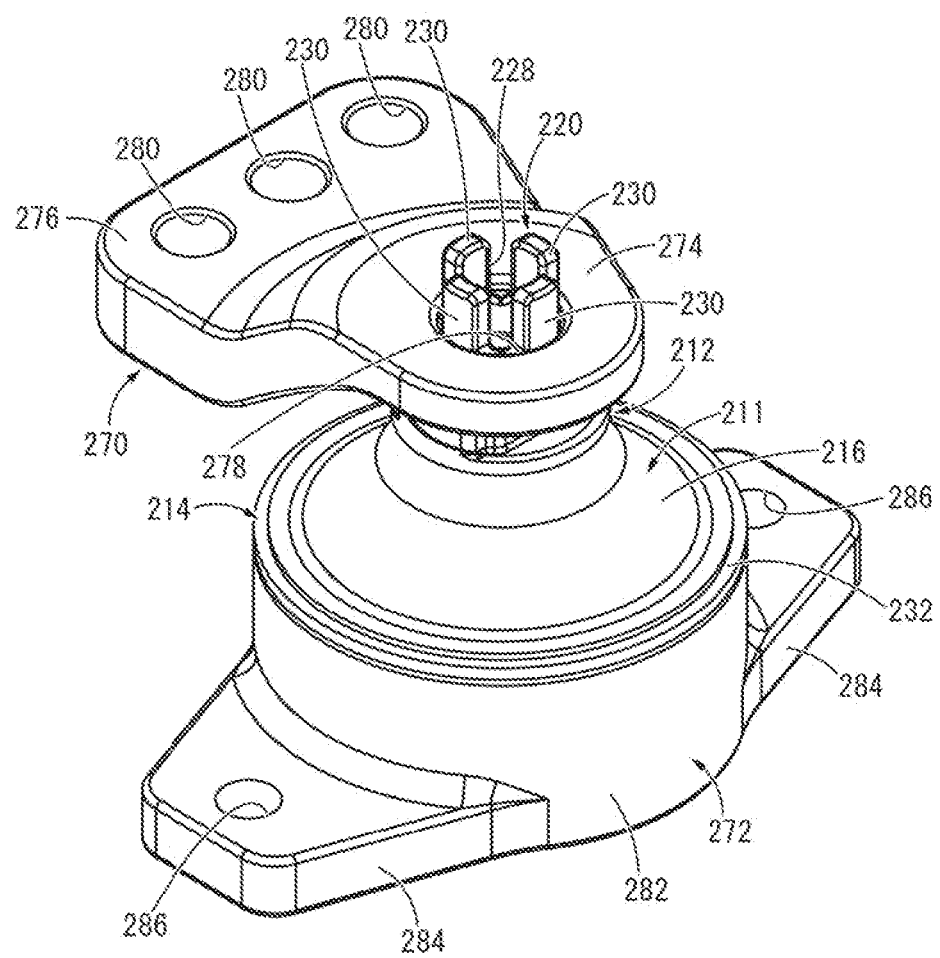
FIG. 16 is an exploded perspective view of the engine mount shown in FIG. 15 representing the situation where a crimping piece of the first mounting member is inserted into an insertion hole of the first bracket.

Under these circumstances, the first bracket 270 is fixed to the first mounting member 212 with the crimping piece 230. In other words, as shown in FIG. 16, the connection plate 274 of the first bracket 270 is overlaid with the base portion 218 of the first mounting member 212 from above, while the crimping piece 230 of the first mounting member 212 is inserted into the insertion hole 278 of the first bracket 270. In the present embodiment, four crimping pieces 230, 230, 230, 230 are inserted into the one insertion hole 278.

Then, the tip end of each crimping piece 230 protruding upward from the insertion hole 278 is bent toward the outer periphery, as shown in FIG. 14, to overlay on the peripheral edge of the opening of the insertion hole 278 from the opposite side of the base portion 218. This allows the connection plate 274 of the first bracket 270 to be held and supported between the base portion 218 of the first mounting member 212 and the crimping piece 230, thus enabling the first mounting member 212 and the first bracket 270 to be fixed to each other. In the present embodiment, the tip end of the four crimping pieces 230, 230, 230, 230 are bent in different directions from each other to extend radially.

The process of bending the crimping piece 230, as hypothetically shown by the chain double-dashed line in FIG. 14 can be carried out, for example by pressing the machining tool 289 against the crimping pieces 230 from above so as to bend the crimping piece 230 toward the outer periphery under a condition where a jig 288 is inserted into the concave grooves 224, 224 of the base portion 218 to adjust the vertical positioning thereof.

Also, the engine mount 210 is mounted to a vehicle by means of having the mounting pan 276 of the first bracket 270 attached to a power unit with an unillustrated bolt that is to be inserted into the bolt hole 280 and having the mounting parts 284, 284 of the second bracket 272 each attached to a vehicular body with an unillustrated bolt that is to be inserted into the bolt hole 286.

According to the engine mount 210 having the structure described above, the first mounting member 212 and the first bracket 270 are fixed to each other by the crimping piece 230, and this fixation can be achieved by a simple structure with fewer parts without any need for an additional member (e.g. bolt). Further, the structure without the metal bolt favorably achieves weight reduction and compactization of the engine mount.

Also, since the first mounting member 212 has a structure where the base portion 218 and the crimping piece 230 made separately are anchored together, properties required for the base portion 218 and those required for the crimping piece 230 are both highly achievable. In the present embodiment, the base portion 218 is formed with synthetic resin to pursue weight reduction, while the crimping piece 230 is formed with metal to make it feasible to fix the first bracket 270 by bending.

In addition, since the base portion 218 is made in a block form, the anchoring area between the base portion 218 and the cylindrical member 220 can be secured large enough to warrant enough anchoring strength. Also, by adopting a structure where the base portion 218 in a block form and the second mounting member 214 in an approximate shape of a circular cylinder are elastically connected by the main rubber elastic body 216 in an approximate shape of a circular truncated cone, fluctuations of internal pressure in the pressure-receiving chamber 264 can be efficiently caused during the vibration input in the axial direction.

Also, the surface of the crimping piece 230 is covered with the rubber sheath layer 240 to avoid direct contact between the crimping piece 230 and the first bracket 270. Therefore, contact corrosion such as galvanic metal corrosion and damages to the surface can be avoided, thus ensuring better durability of the parts.

Also, the plurality of crimping pieces 230 are inserted into the one insertion hole 278 to be crimped and fixed by being bent toward the outer periphery. This allows the first mounting member 212 and the first bracket 270 to be fixed firmly by differentiating the bending direction of each crimping piece 230 even with a small number of insertion holes 278.

Moreover, in the present embodiment, the engine mount 210 is made to be a fluid-filled vibration damping device wherein non-compressible fluid is poured into the fluid chamber 244 via the filler hole 222 that opens toward the inner periphery of the cylindrical member 220. This allows the filler hole 222 for subsequent liquid pouring to the fluid chamber 244 to be formed making the most of the cylindrical central hole of the crimping piece 230.

Figure 17:
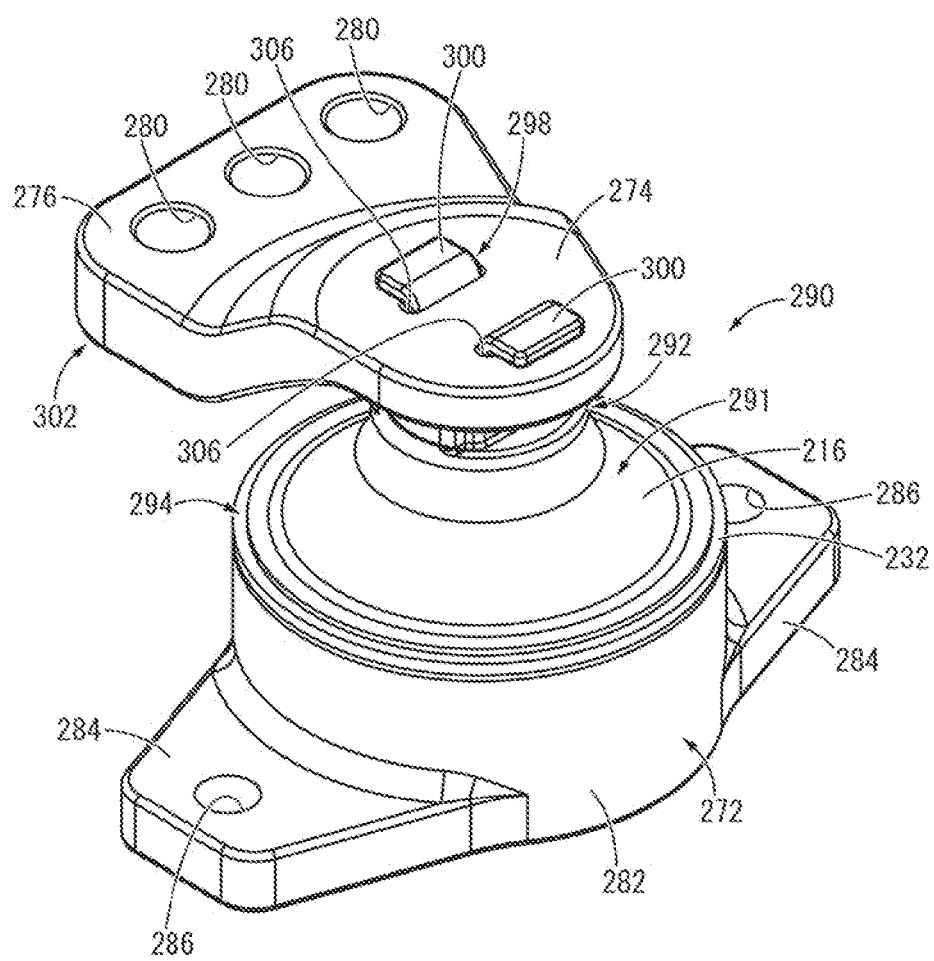
FIG. 17 is a perspective view of an engine mount as a fifth embodiment of the present invention.
Figure 18:
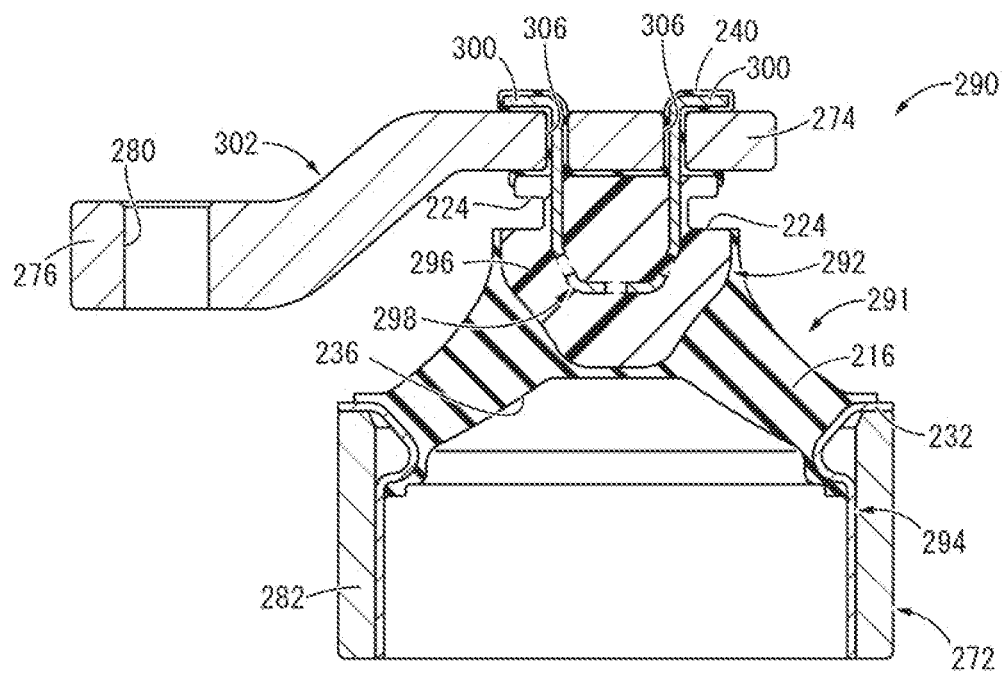
FIG. 18 is a longitudinal cross sectional view of the engine mount shown in FIG. 17.

FIGS. 17, 18 show an engine mount 290 as a fifth embodiment of the present invention, which serves as a vibration damping device. The engine mount 290 is provided with a mount main body 291, which has a structure where a first mounting member 292 and a second mounting member 294 are elastically connected by the main rubber elastic body 216. In the following paragraphs, descriptions of the members and parts that are substantially the same as those of the fourth embodiment will be omitted by assigning the same reference numbers in the drawings.

More specifically, the first mounting member 292 has a structure where a base portion 296 serving as an anchoring member and a crimping fitting 298 serving as a fixing member that are made separately are anchored together.

The base portion 296 is a rigid member formed with synthetic resin in a block form extending in the axial direction with an approximately circular cross section with its lower portion made in a taper form with the diameter gradually decreasing downward.

Figure 19:
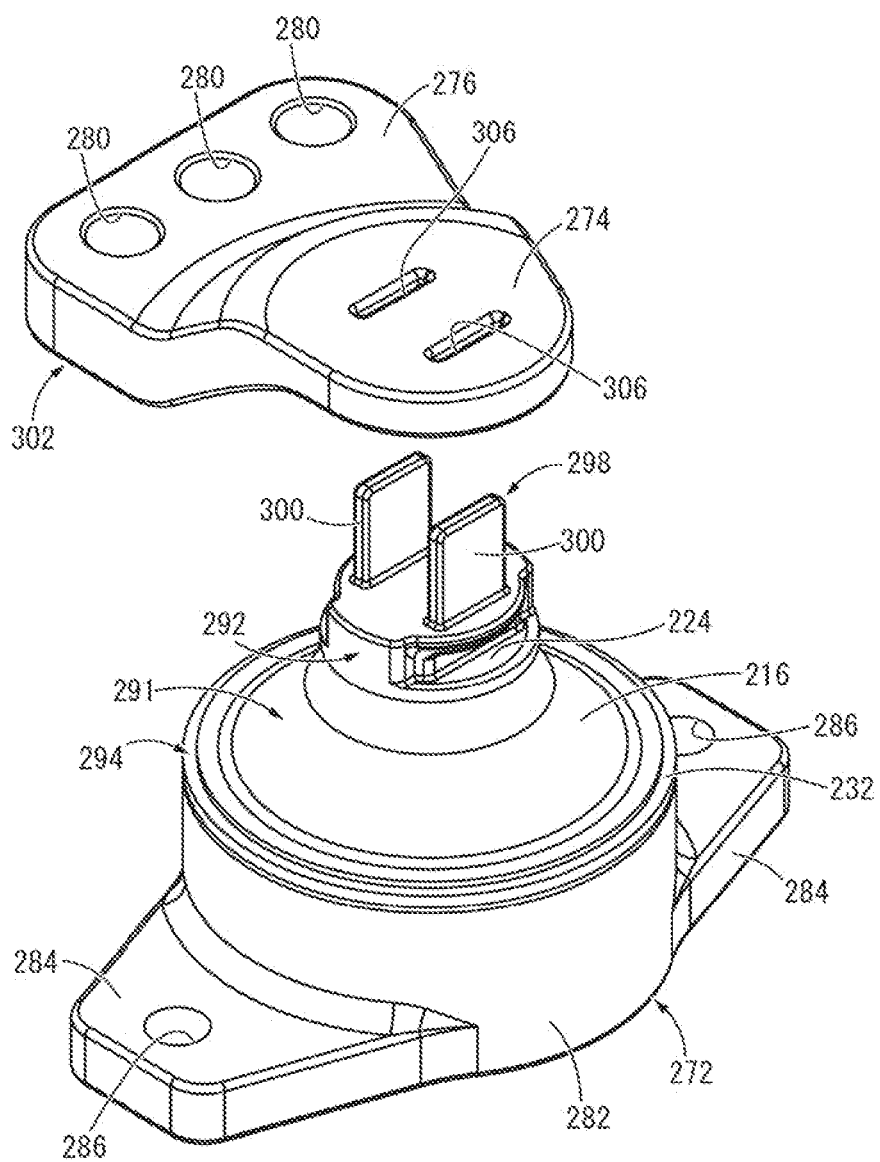
FIG. 19 is an exploded perspective view of the engine mount shown in FIG. 17 before attachment of a first mounting member and a first bracket.

The crimping fitting 298 is formed with metal such as iron with a cross section in an approximate U-shape groove as shown in FIG. 18, both ends of which extend upward to make a pair of crimping pieces 300. The pair of crimping pieces 300, 300 are in an approximate shape of a flat plate extending in nearly parallel to face each other in the thickness direction. The crimping fitting 298 of the present embodiment can be obtained, for example by means of bending an iron plate in a shape of a rectangular plate into an approximate U-shape by press work. Also, the crimping fitting 298 is made in an approximate shape of a flat plate protruding upward as a whole, as shown in FIG. 19, before the first bracket 302 described later is fixed thereto.

Then, the lower portion of the crimping fitting 298 is anchored to the base portion 296 and buried therein so that the base portion 296 protrudes downward from the crimping fining 298. Also, the crimping pieces 300, 300 constituting the upper portion of the crimping fitting 298 protrude upward from the base portion 296. The crimping fitting 298 is preferably inserted into the base portion 296 during the molding, as is the case with the fourth embodiment described above, to be anchored to the base portion 296 at the same time as the molding thereof.

The second mounting member 294 is a high-rigidity member formed with metal such as iron or aluminum alloy in an approximate shape of a thin and large-diameter circular cylinder, the upper end portion of which is provided with an anchoring portion in a form of a groove that is convex toward the inner periphery and the flange portion 232 protruding toward the outer periphery from the top end of the anchoring portion.

Then, the first mounting member 292 and the second mounting member 294 are arranged one above the other on approximately the same axis to be elastically connected to each other by the main rubber elastic body 216. Also, the crimping piece 300 is covered with the rubber sheath layer 240 integrally formed with the main rubber elastic body 216. The rubber sheath layer 240 extends to cover the outer peripheral face of the base portion 296 off the locations of the concave grooves 224, 224 and is integrally connected to the main rubber elastic body 216.

The mount main body 291 having the structure described above has a first bracket 302 serving as a bracket and a second bracket 272 attached thereto.

On the connection plate 274 of the first bracket 302, a pair of slits 306, 306 are formed as insertion holes. The slit 306 is a hole with a cross section in an approximate shape of an elongated rectangle penetrating through the connection plate 274 in the thickness direction. Also, the pair of slits 306, 306 are provided at a given distance in the width direction to face each other, extending in parallel to each other.

Figure 20:
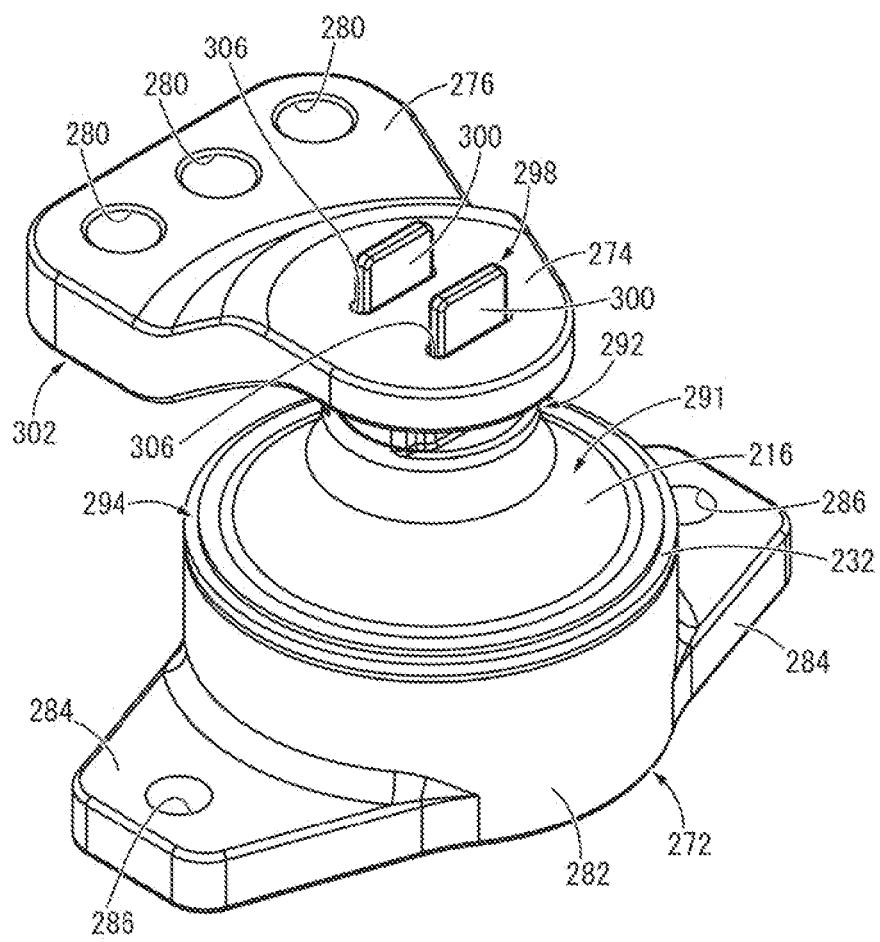
FIG. 20 is an exploded perspective view of the engine mount shown in FIG. 19 representing the situation where a crimping piece of the first mounting member is inserted into an insertion hole of the first bracket.

Then, the first bracket 302 has the connection plate 274 overlaid with the first mounting member 292 from above, while, as shown in FIG. 20, the pair of crimping pieces 300, 300 of the first mounting member 292 are inserted through the pair of slits 306, 306 respectively. In addition, the protrusion tip of the crimping piece 300 protruding upward from the connection plate 274 via the slit 306 is bent in the thickness direction as shown in FIGS. 17, 18 to be overlaid on the connection plate 274 from the opposite side of the base portion 296. This allows the connection plate 274 of the first bracket 302 to be held between the base portion 296 and the crimping piece 300 of the first mounting member 292 so as to let the first mounting member 292 and the first bracket 302 be fixed to each other. During the bending process of the crimping piece 300, the jig 288 can be inserted into the pair of concave grooves 224, 224 to position the base portion 296 even in the present embodiment, as is the case with the fourth embodiment.

Further, the crimping piece 300 is inserted through the slit 306 to be fixed under a condition where the rubber sheath layer 240 adhered to the surface thereof is compressed, and the space between the crimping piece 300 and the inner peripheral face of the slit 306 is sealed fluid-tight by the rubber sheath layer 240. Also, due to the interposition of the compressed rubber sheath layer 240 between the crimping piece 300 and the slit 306, the crimping piece 300 is positioned in place within the slit 306.

In the present embodiment, the pair of crimping pieces 300, 300 are bent outward in opposing directions to each other, thus enabling to favorably obtain fixing strength. However, the pair of crimping pieces 300, 300 can be bent in the same direction.

In the engine mount 290 having the structure according to the present embodiment described above, since each of the crimping pieces 300 is inserted through one of the slits 306 to be fixed, the plurality of crimping pieces 300 and slits 306 can each be provided at any position. Therefore, the connection strength between the first mounting member 292 and the first bracket 302 can favorably be obtained for example by means of inserting the pair of crimping pieces 300, 300 through the slits 306, 306 to be fixed at positions away from each other.

Especially since the pair of crimping pieces 300, 300 and the pair of slits 306, 306 are provided at a distance in the width direction to extend in parallel to each other, the connection strength between the first mounting member 292 and the first bracket 302 can be obtained more favorably.

Also, since the space between the crimping piece 300 and the slit 306 is sealed fluid-tight by the rubber sheath layer 240, the mount main body 291 is protected against rain water and the like falling from above the first bracket 302, thus avoiding any deterioration of durability. In addition, by filling the space between the crimping piece 300 and the slit 306 with the rubber sheath layer 240, the first mounting member 292 and the first bracket 302 are positioned more favorably, thus avoiding any rattling of the first bracket 302 hitting against the mount main body 291.

The fourth and fifth embodiments of the present invention relating to the first and eighth to fifteenth aspects mentioned above have been described in detail, but the present invention is not limited to those specific descriptions of the fourth and fifth embodiments. For example, the second bracket is not an essential component, not to mention in the mounting member but also in the vibration damping device relating to the present invention.

Also, in the fourth embodiment, a plurality of insertion holes can be made in the first bracket, into which a plurality of crimping pieces can be inserted, respectively, to be fixed therein.

Further, in the fluid-filled vibration damping device such as the one of the fourth embodiment, a filler hole can be provided for subsequent pouring of non-compressible fluid into the fluid chamber, but non-compressible fluid can be sealed in the fluid chamber without providing a filler hole by means of assembling the partition member and the flexible film with the second mounting member within a tank filled with non-compressible fluid.

Moreover, in the vibration damping device of the fourth embodiment, if rain water and the like falls on the cylindrical member in a state of being mounted to a vehicle for example, a buildup of rainwater in the central hole of the cylindrical member can be prevented by making a drainage hole in the cylindrical member or by providing a cap to close the opening thereof.

Also, in the fifth embodiment, the number of slits and crimping pieces and the arrangement thereof are not particularly limited but can be changed as appropriate. It is possible to adopt the fixing structure shown in the fourth embodiment wherein the crimping pieces made by dividing the tip of the cylindrical member along the circumference are inserted into the insertion hole to be fixed therein together with the fixing structure shown in the fifth embodiment wherein the crimping pieces covered with the rubber sheath layer are inserted into the slit-like insertion hole to be fixed therein.

Since the anchoring member is made of resin in the present invention relating to the first to fifteenth aspects, the shape of the anchoring member can be designed with a high degree of freedom without any particular limit. Especially when the present invention is applied to the first mounting member of the multi-directional-type vibration damping device such as the one disclosed in Japanese Unexamined Patent Publication No. JP-A-2002-227912, vibration damping performance in the transaxial direction of the anchoring member shown in the first embodiment, for example, can be enhanced by means of providing an anchoring shaft in a shape of a small-diameter circular cylinder extending downward from the main body portion 24. It is also possible to make the diameter of the main body portion 24 of the anchoring member 14 larger than the width of the cylindrical joint member 12.

In addition, in the first to fifth embodiments as those of the present invention relating to the first aspect described above, examples are all about a vibration damping device to be applied to an engine mount, but none the inventions relating to the first to fifteenth aspects are limited to be applied only to engine mounts, but they can all be applied, for example, to body mounts, sub-frame mounts, differential mounts and the like. Also the application range of the present invention is not limited to the fluid-filled vibration damping device or the solid-type vibration damping device with no fluid sealed in for motor vehicles, but can also be favorably applied to the fluid-filled vibration damping device or the solid type vibration damping device for motor cycles, railroad vehicles, and industrial vehicles, for example.

What is claimed is:

1. A mounting member for use in a vibration damping device equipped with a main rubber elastic body and a bracket, comprising:
    a fixing member configured to be fixed to the bracket; and
    an anchoring member made of resin and configured to be anchored to the main rubber elastic body, wherein
        the anchoring member is anchored to the fixing member and protrudes from the fixing member,
        the fixing member comprises a cylindrical joint member configured to receive the bracket fitted therein, the anchoring member is anchored to a part of an outer peripheral face of the cylindrical joint member, and the anchoring member protrudes outward from the outer peripheral face of the cylindrical joint member,
        the anchoring member integrally includes a main body portion protruding from an outer peripheral face of a peripheral wall portion of the cylindrical joint member as well as configured to be anchored to the main rubber elastic body, and an engaging part that is engaged with an inner peripheral face of the peripheral wall portion of the cylindrical joint member, and
        a recess is formed on the peripheral wall portion of the cylindrical joint member so as to open to the inner peripheral face thereof, and the engaging part of the anchoring member is anchored to the recess.

2. The mounting member according to claim 1, wherein a communication hole is formed through the peripheral wall portion of the cylindrical joint member so that the main body portion and the engaging part of the anchoring member are connected to each other via the communication hole.

3. The mounting member according to claim 1, wherein the main body portion and the engaging part of the anchoring member are connected to each other at an opening of the cylindrical joint member.

4. A vibration damping device comprising:
    a first mounting member;
    a second mounting member;
    a main rubber elastic body elastically connecting the first and second mounting members; and
    a bracket fixed to the first mounting member, wherein
        the first mounting member is composed of a mounting member that includes a fixing member in the form of a cylindrical joint member configured to receive the bracket fitted therein and an anchoring member made of resin and configured to be anchored to the main rubber elastic body, the anchoring member being anchored to a part of an outer peripheral face of the cylindrical joint member and protruding outward from the outer peripheral face of the cylindrical joint member,
        the anchoring member integrally includes a main body portion protruding from an outer peripheral face of a peripheral wall portion of the cylindrical joint member as well as configured to be anchored to the main rubber elastic, body and an engaging part that is engaged with an inner peripheral face of the peripheral wall portion of the cylindrical joint member,
        a recess is formed on the peripheral wall portion of the cylindrical joint member so as to open to the inner peripheral face thereof, and the engaging part of the anchoring member is anchored to the recess,
        the main rubber elastic body is anchored to the anchoring member, and a rubber sheath layer is adhered to an inner peripheral face of the cylindrical joint member so that the bracket is fitted in the cylindrical joint member via the rubber sheath layer.

* * * * *